United States Patent
Neben

(10) Patent No.: US 8,719,613 B2
(45) Date of Patent: May 6, 2014

(54) SINGLE-WIRE SERIAL INTERFACE WITH DELAY MODULE FOR FULL CLOCK RATE DATA COMMUNICATION BETWEEN MASTER AND SLAVE DEVICES

(75) Inventor: Gary Neben, Boulder, CO (US)

(73) Assignee: Futurewei Technologies, Inc., Plano, TX (US)

( * ) Notice: Subject to any disclaimer, the term of this patent is extended or adjusted under 35 U.S.C. 154(b) by 631 days.

(21) Appl. No.: 13/013,625

(22) Filed: Jan. 25, 2011

(65) Prior Publication Data

US 2011/0185215 A1    Jul. 28, 2011

Related U.S. Application Data

(60) Provisional application No. 61/299,264, filed on Jan. 28, 2010.

(51) Int. Cl.
| G06F 1/12 | (2006.01) |
| G06F 13/42 | (2006.01) |
| G06F 5/00 | (2006.01) |
| G06F 7/00 | (2006.01) |
| H04L 7/00 | (2006.01) |
| H04L 25/00 | (2006.01) |

(52) U.S. Cl.
CPC . *H04L 7/00* (2013.01); *H04L 25/00* (2013.01)
USPC .......................................................... 713/401

(58) Field of Classification Search
CPC ................................. H04L 7/00; H04L 25/00

USPC .......................................................... 713/400
See application file for complete search history.

(56) References Cited

U.S. PATENT DOCUMENTS

| 5,495,240 | A | 2/1996 | Heberle | |
| 6,604,203 | B1 * | 8/2003 | Mu et al. | 713/400 |
| 7,085,949 | B2 * | 8/2006 | Mar et al. | 713/400 |
| 7,149,825 | B2 | 12/2006 | Bunker et al. | |
| 7,590,882 | B2 * | 9/2009 | Ferraiolo et al. | 713/600 |
| 7,596,699 | B2 * | 9/2009 | Kwok | 713/176 |
| 8,352,774 | B2 * | 1/2013 | Elrabaa | 713/600 |
| 2004/0037383 | A1 * | 2/2004 | Song | 375/371 |
| 2004/0047441 | A1 * | 3/2004 | Gauthier et al. | 375/376 |
| 2005/0018799 | A1 * | 1/2005 | Boerstler et al. | 375/360 |
| 2005/0039066 | A1 * | 2/2005 | Simon et al. | 713/400 |
| 2005/0052440 | A1 * | 3/2005 | Kim et al. | 345/204 |
| 2006/0039408 | A1 * | 2/2006 | Wortel et al. | 370/470 |
| 2007/0297551 | A1 * | 12/2007 | Choi | 375/371 |
| 2010/0039150 | A1 * | 2/2010 | Berhanu et al. | 327/153 |
| 2010/0064074 | A1 | 3/2010 | Hansquine et al. | |

FOREIGN PATENT DOCUMENTS

| WO | 0062455 | 10/2000 |
| WO | 2005114922 A1 | 12/2005 |

\* cited by examiner

*Primary Examiner* — Mohammed Rehman
(74) *Attorney, Agent, or Firm* — Conley Rose, P.C.; Grant Rodolph; Nicholas K. Beaulieu

(57) ABSTRACT

A circuit comprising a single-wire serial interface (SWSI), a delay module coupled to the SWSI and operable to introduce a delay during a data transmission, the delay being dependent on a local clock (LC) associated with the circuit, wherein the delay enables the circuit to synchronize the data transmission with a device coupled to the SWSI based on the LC.

19 Claims, 23 Drawing Sheets

— continued —

SINGLE-WIRE SERIAL INTERFACE WITH DELAY MODULE FOR FULL CLOCK RATE DATA COMMUNICATION BETWEEN MASTER AND SLAVE DEVICES

CROSS-REFERENCE TO RELATED APPLICATIONS

The present application claims priority to U.S. Provisional Patent Application No. 61/299,264 filed Jan. 28, 2010 by Gary Neben and entitled "Single-Wire Serial Interface (SSI)," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication systems based on various communication protocols are commonly employed for enabling communication between devices. Such protocols often employ a data link or bus such as a serial peripheral interface (SPI) or a synchronous serial interface (SSI) for communicatively linking devices together. A typical SPI or SSI bus may include a multi-wire interface for communicating signals between a master device and one or more slave devices. For example, a multi-wire interface may include wires designated for communicating a start/stop signal, a chip/slave select signal, a data signal, a clock signal, etc. In recent years, single-wire interfaces have been developed for providing communication between a single master device and a single slave device.

As a general matter, a single-wire interface may sometimes be preferred over a multi-wire interface for purposes such as cost and/or performance. For instance, the additional wires in a multi-wire interface require more components (e.g., pins, connectors, etc.), which add cost and may increase electrical noise and interference. On the other hand, communicating with multiple slave devices via a single-wire interface may require additional interfaces, which typically require additional parts such as pins and/or pads for enabling communication with the master device. As a result, overall complexity and/or cost may increase, e.g., due to increase die size, pin count, etc. In addition, a single-wire interface generally requires a timer such as an over-sampling clock for synchronizing data transmissions via a common clock signal, which may entail complex logic to recover data. Therefore, it would be desirable to provide an improved interface that overcomes the drawbacks associated with the aforementioned interfaces.

SUMMARY

In one aspect, the disclosure includes a circuit comprising a single-wire serial interface (SWSI), a delay module coupled to the SWSI and operable to introduce a delay during a data transmission, the delay being dependent on a local clock (LC) associated with the circuit, wherein the delay enables the circuit to synchronize the data transmission with a device coupled to the SWSI based on the LC.

In another aspect, the disclosure includes a system comprising a SWSI for enabling data transmissions between devices, a master device and a slave device interfaced to the SWSI, the master device including a master local clock (MLC) and the slave device including a slave local clock (SLC), wherein the master device and the slave device are each operable to employ the MLC and the SLC, respectively, for transmitting and recovering data via the SWSI, and a delay module for introducing a delay when one of the master device or the slave device is to recover data transmitted over the SWSI by the other of the slave device or the master device, respectively, wherein the delay enables the master device and the slave device to transmit and recover data via the SWSI at a full clock rate.

In yet another aspect, the disclosure includes a circuit associated with a device interfaced to a SWSI, the circuit comprising a delay module coupled to the SWSI and operable to introduce a delay when the circuit is to recover data transmitted to the device through the SWSI, the delay being relative to a LC associated with the circuit, a data analysis module coupled to the delay module and operable to determine an edge of the LC for sampling the transmitted data, wherein the delay enables the data analysis module to determine the edge, and a data capture module coupled to the data analysis module and operable to recover the transmitted data in accordance with the edge determined by the data analysis module.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a single-wire interface for communicating data between a master device and at least one slave device. Each device employs a local clock for use in synchronizing data transmissions between the devices. When a master device or a slave device transmits data through the single-wire interface, a delay module associated with the intended recipient (the master device or the slave device) is operable to introduce a delay relative to the local clock of the receiving device. The delay enables the receiving device to determine an appropriate edge (positive or negative) of its local clock to sample the transmitted data successfully. As a result, the master device and the slave device may perform data transfers over the single-wire interface at a full clock rate.

Figure 1:
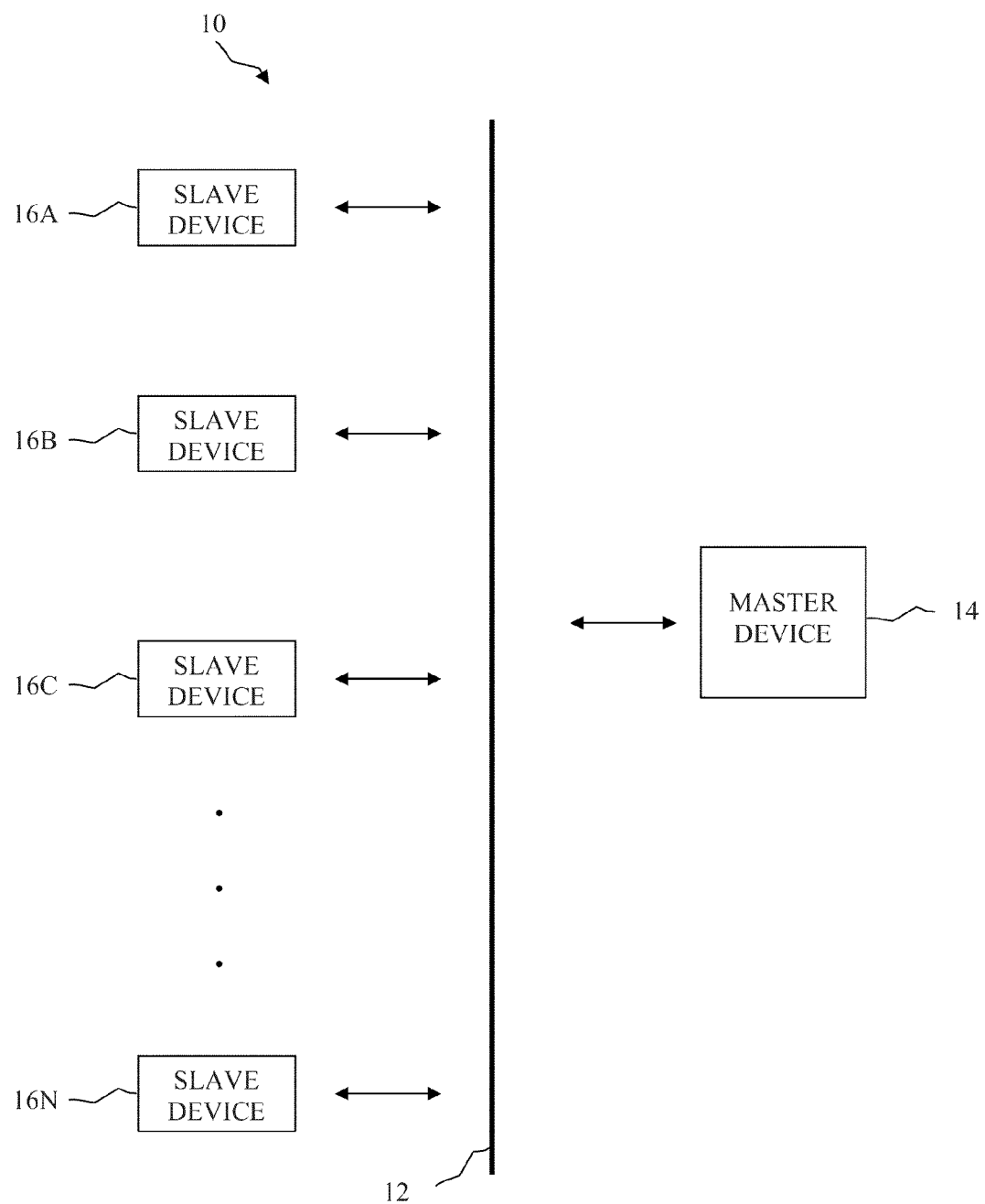
FIG. 1 is a schematic diagram of a system including a single-wire serial interface for communicating between devices.

Referring to FIG. 1, a system embodying the principles of the present disclosure is illustrated therein and designated as 10. The system 10 comprises a single-wire serial interface (SWSI) 12 operable to enable data transmissions among devices within an integrated circuit (IC) or between multiple ICs. In a master-slave implementation, a master device 14 may utilize the SWSI 12 to communicate with one or more slave devices 16A-16N. Unless otherwise indicated, "slave devices 16" will herein refer collectively to slave devices 16A-16N, where "slave device 16" may refer to any one of the slave devices 16A-16N.

As skilled artisans will readily appreciate, devices such as the master and slave devices 14 and 16 may interface to the SWSI 12 according to any suitable manner, such as, but not limited to, via pins, ports, die pads, etc. In one implementation, devices may interface to the SWSI 12 based on inter-die connections (e.g., pad-to-pad), without pins. Alternatively, devices may interface to the SWSI 12 based on inter-chip connections (e.g., block-to-block), with neither pads nor pins. Notwithstanding the type of interface connection employed, those versed in the art will understand that the SWSI 12 may generally require fewer components than a multi-wire interface. For example, in an implementation where devices connect to an interface via pins and ports, a multi-wire interface would normally require more pins than a single-wire interface such as the SWSI 12. Therefore, using the SWSI 12 may reduce the number of required pins, which would also increase the number of available ports that may be used for other related and/or non-related purposes.

In an embodiment, the master device 14 and the slave devices 16 each include a separate local clock for use in communicating data via the SWSI 12. For instance, a master local clock (MLC) may be independently generated on a master chip associated with the master device 14, and a slave local clock (SLC) may be independently generated on a slave chip associated with a slave device 16. As those familiar in the art will understand, the MLC and SLC may each be generated according to any known or later developed technique (e.g., via local oscillators). Similarly, it is to be understood any suitable clock or timing mechanism may be used. In a non-limiting example, a single-sourced clock (e.g., a common clock redistributed through the system 10) may be employed instead of independently-generated clocks.

Additionally, the MLC and SLC may each support data transmissions via the SWSI 12 at various transfer rates, such as, but not limited to, frequencies ranging from about 19.2 MHz to about 52 MHz. According to one aspect, the MLC and SLC may be phase-independent of each other (i.e., the MLC and SLC may each have a different phase), although the MLC is configured to have the same frequency as the MLC. Skilled artisans will appreciate that there may be instances where providing separate clocks (e.g., from different or distributed source(s)) with identical frequencies is impractical. Thus, the frequency of the MLC may not necessarily be identical to the frequency of the SLC, as a certain amount of frequency error between the MLC and the SLC may be tolerable.

As those of ordinary skill in the art will understand, the master device 14 and the slave devices 16 may each include circuitry and logic to distribute data frames (i.e., encoded data packets) to the SWSI 12, as well as circuitry and logic to collect the data frames as they arrive through the SWSI 12. Data frames may include fields composed of various types of bits, such as one or more SYNC bits, read and/or write (R/W) bits, address bits, data bits, reset bits, acknowledge (ACK) bits, etc. While the examples discussed herein generally refer to certain data frames, skilled artisans will readily appreciate that data frames may include various fields containing any suitable type and/or number of bits.

Figure 2A:
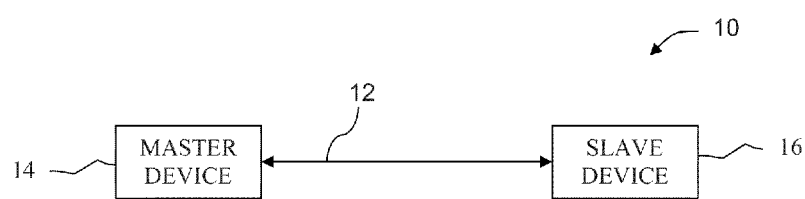
FIG. 2A is a schematic diagram of the system according to an embodiment of the disclosure.

FIG. 2A illustrates an embodiment of the system 10 based on a point-to-point topology in which a single master device 14 communicates with a single slave device 16 via the SWSI 12. Those of ordinary skill in the art will understand that in a point-to-point topology such as that shown in FIG. 2A, the master device 14 may also communicate with slave devices 16A-16N via N wires. Thus, while the master-slave implementation shown in FIG. 2A only employs one SWSI 12, one or more additional SWSIs 12 may be employed for facilitating communications between the master device 14 and any desired combination of slave devices 16. In FIG. 1, for example, the master device 14 may communicate with slave devices 16A and 16B via one SWSI 12, and separately communicate with slave device 16C and/or slave devices 16C-16N via another SWSI 12. Accordingly, multiple SWSIs 12 may be provided to support multiple communication channels between the master device 14 and the slave devices 16.

Individuals familiar in the art will readily appreciate that a slave device 16 integrated on a chip may include various modules or units within that chip. In such an implementation, a slave device 16 may include a multi-point drop or extension for communicating with multiple modules within the slave device 16. According to an embodiment, one SWSI 12 may be employed for enabling communication between a master device 14 integrated on a master chip and a slave device 16 integrated on a slave chip. Additionally, if the slave device 16 includes multiple modules integrated within the slave chip, the SWSI 12 may be bussed or otherwise linked to one or more of the modules. As such, the master device 14 may be configured to communicate with multiples modules via the SWSI 12. Furthermore, a similar multi-drop feature may be accomplished outside of a master and/or slave chip. For instance, a single wire may extend from a master device 14 and into a SWSI 12, where the SWSI 12 may be employed as a universal data line that is single-wired to multiple slave devices 16 integrated on multiple slave chips.

Figure 2B:
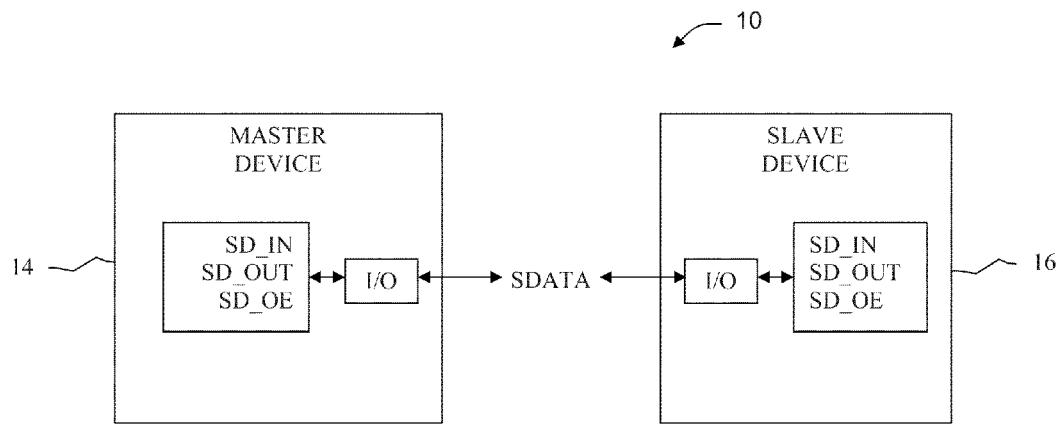
FIG. 2B is a schematic diagram of a master device and a slave device according to an embodiment of the disclosure.

FIG. 2B depicts a basic example of a master device 14 and a slave device 16, both of which may include any features described herein. The master device 14 and the slave device 16 may each include an input/output (I/O) device for communicating data over the SWSI bus 12, as represented by SWSI data (SDATA) in FIGS. 2B and 3. Details regarding the manner in which the master device 14 and the slave device 16 may communicate will be discussed further below. Briefly, when an I/O device of a device 14 or 16 receives data, the I/O device may deliver an input signal (SD_IN) indicative of the received data to the receiving device 14 or 16. Similarly, an I/O device may communicate data for a device 14 or 16 in response to receiving an output signal (SD_OUT) indicative of the data the transmitting device 14 or 16 seeks to transmit. Further, a device 14 or 16 may be enabled for input (SD_IN) or output (SD_OUT) upon receiving an enabling signal (SD_OE).

As skilled artisans will readily appreciate, the master and slave devices 14 and 16 may comprise any suitable type of communication devices, and may employ any suitable circuitry to communicate, e.g., radio frequency (RF) circuits, antennas, etc. In one aspect, a master device 12 may comprise a controller operable to control a slave device 16 by communicating control signals, request commands, etc. Similarly, a slave device 16 may comprise any suitable device (e.g., sensors, transceivers, and the like) operable to receive such signals and responsively transmit the requested data to a master device 14. In addition, the master and slave devices 14 and 16 may each include various components commonly employed in such devices. For instance, the devices 14 and 16 may include a processor such as a microprocessor, microcontroller, or digital signal processor having a central processing unit (CPU). The master and slave devices 14 and 16 may also include storage media such as memory (e.g., read only memory (ROM), random access memory (RAM), and erasable programmable ROM (EPROM)) or storage devices (e.g., disk drives, compact discs (CDs), and digital video discs (DVDs)), etc. Of course, numerous other components associated with the devices 14 and 16 may be similarly employed, and therefore, necessarily fall within the purview of the present disclosure. Further, since the construction and operation of components associated with devices of the sort disclosed herein is well known and understood, discussion of the master and slave devices 14 and 16 will herein be limited to the extent necessary for enabling a proper understanding of the present disclosure.

Figure 3:
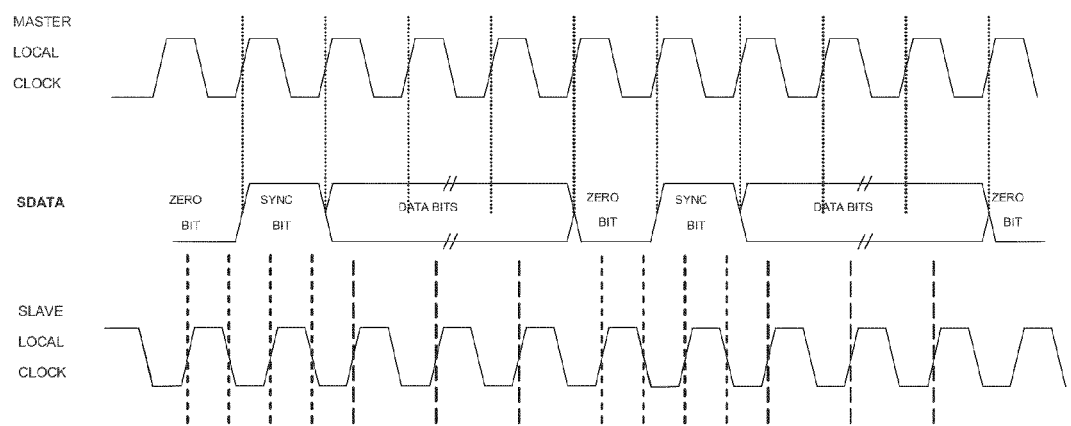
FIG. 3 is a timing diagram illustrating waveforms corresponding to data transmissions between devices in the system.

Referring now to FIG. 3, a timing diagram illustrates an example of data transmissions via the SWSI between devices, such as between a master device 14 and a slave device 16 depicted in FIGS. 2A and 2B. When data transmissions are not taking place, SDATA is low (e.g., the SWSI 12 may be in an idle state), whereas devices interfaced to the SWSI may be in an active state. In the present disclosure, the term "low" generally refers to a "low state," logic "0," low or zero voltage (e.g., ground), etc. In contrast, "high" generally refers to a high state (e.g., active), logic "1," high, positive voltage, etc. However, it is to be understood these terms are used arbitrarily defined, as "low" and "high" may be used interchangeably. Similarly, although various examples disclose a first or start bit being a SYNC bit including a "0" or "1" to denote a read or write access, any suitable bit and/or number may be used instead. For example, SDATA in FIG. 3 could begin with an idle state of "1" and then transition to a SYNC bit with state "0".

To communicate data through the SWSI, a device (e.g., master device 14) may transmit a signal beginning with a pulse containing a synchronization (SYNC) bit, which pulls the intended receiving device (e.g., slave device 16) high. The receiving device may sample the SYNC bit and use its local clock (e.g., MLC or SLC) to synchronize the transmission of the following data bits in SDATA. In an embodiment, the receiving device may determine whether to sample data bits on either a rising or falling edge of its local clock. In FIG. 3, the dashed vertical lines over SLC denote the sampling points, which illustrate that data bits may be communicated via the SWSI at a full speed or clock rate. As discussed further below, data communicated between devices via the SWSI may be transmitted and recovered at a rate of one bit per clock cycle. Once a data transmission is complete, SDATA may return low.

Figure 4:
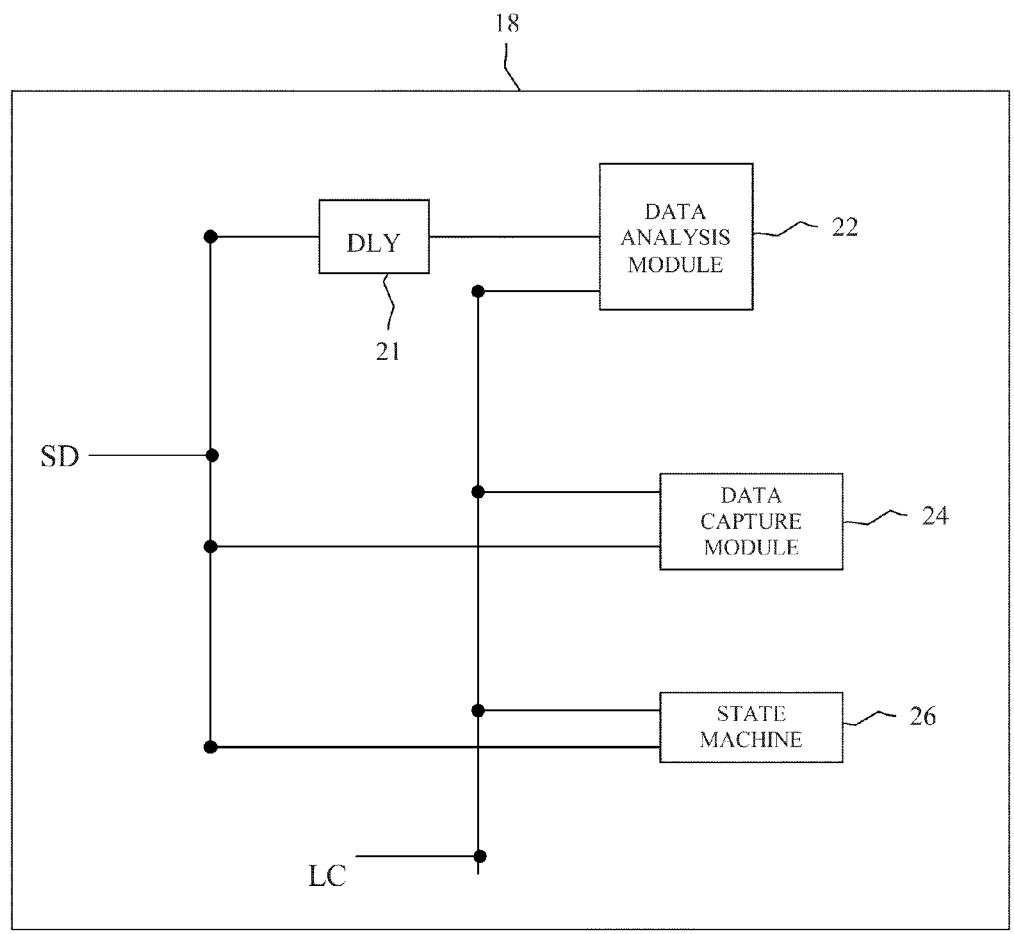
FIG. 4 is a schematic diagram of a circuit according to an embodiment of the disclosure.
Figure 5:
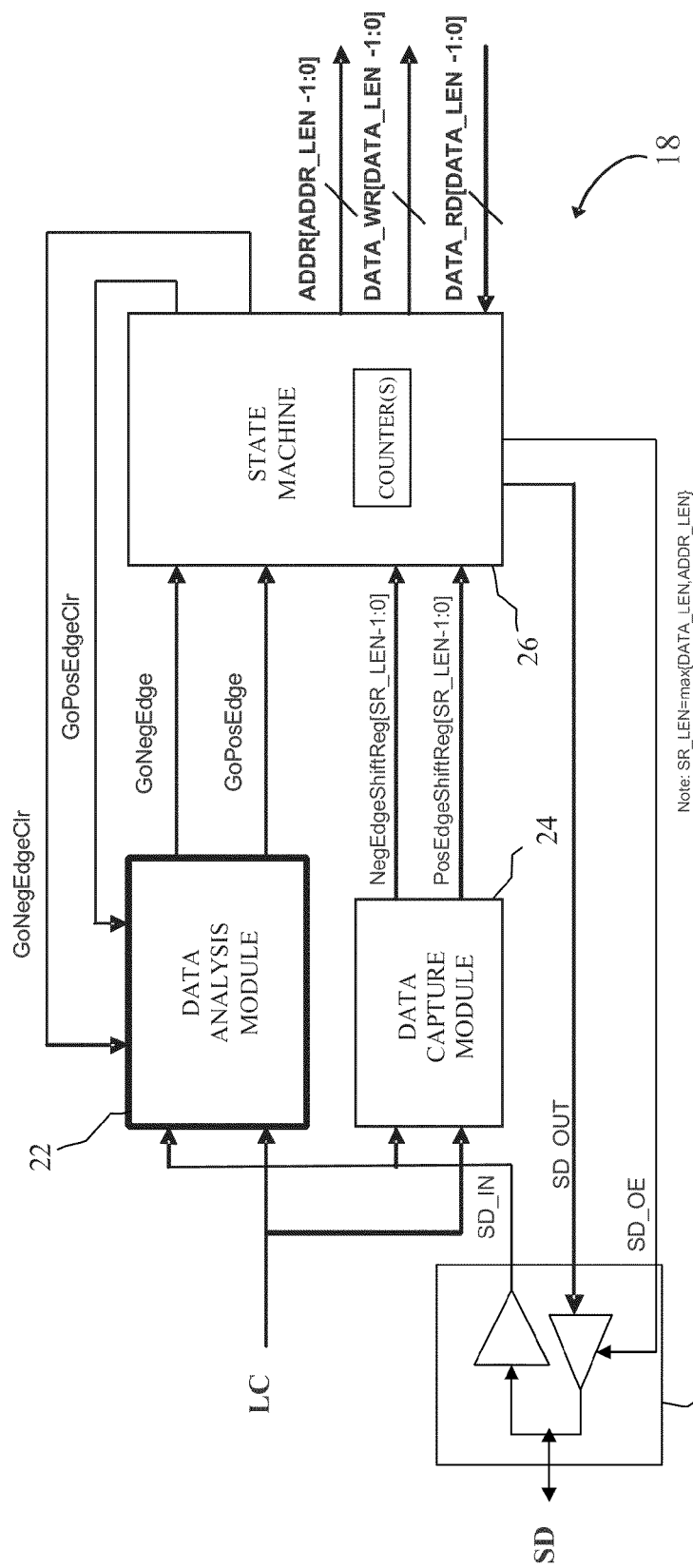
FIG. 5 is a schematic diagram illustrating the relationship between components implemented in the circuit.
Figure 6:
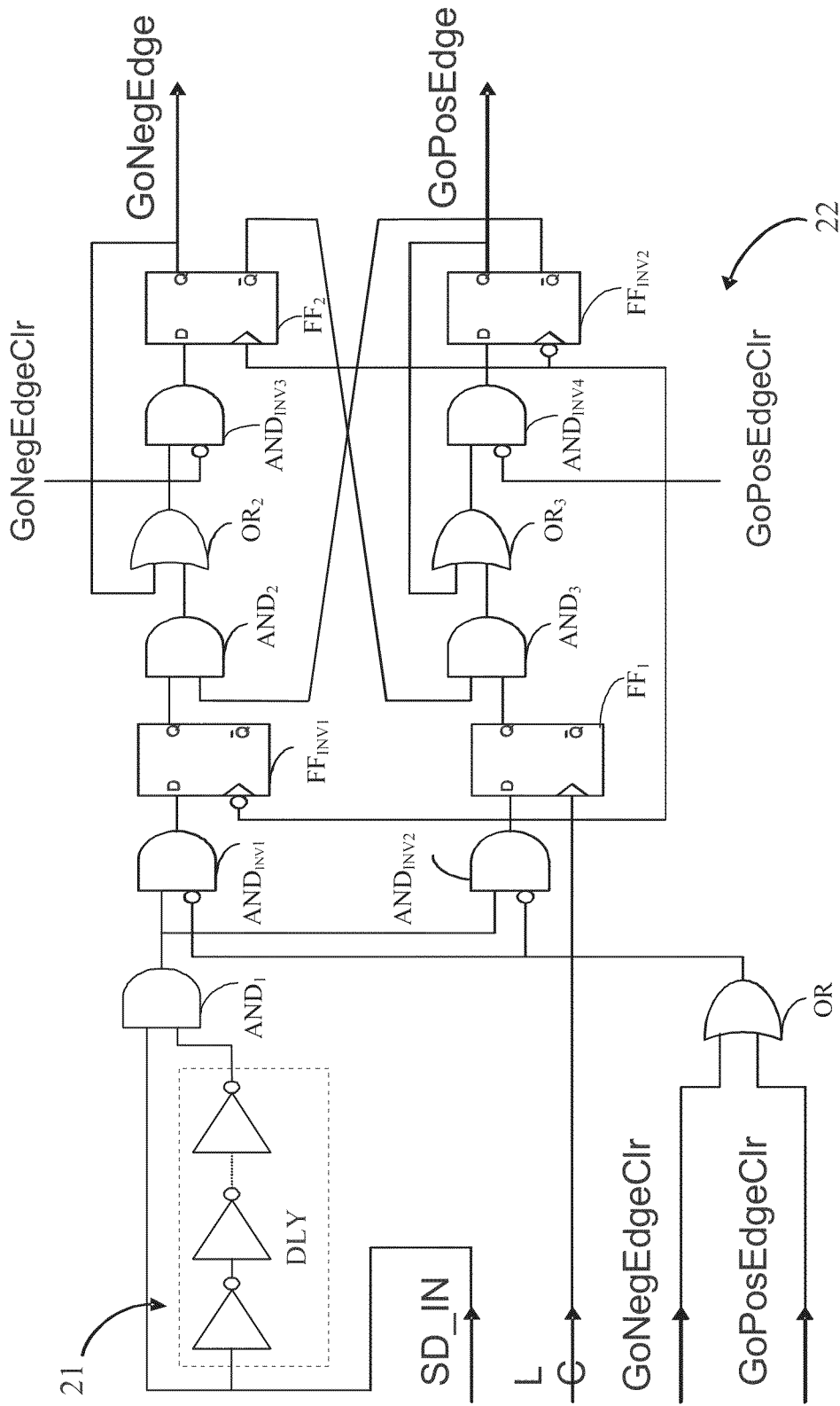
FIG. 6 is a schematic diagram of a data analysis module associated with the circuit.
Figure 7:
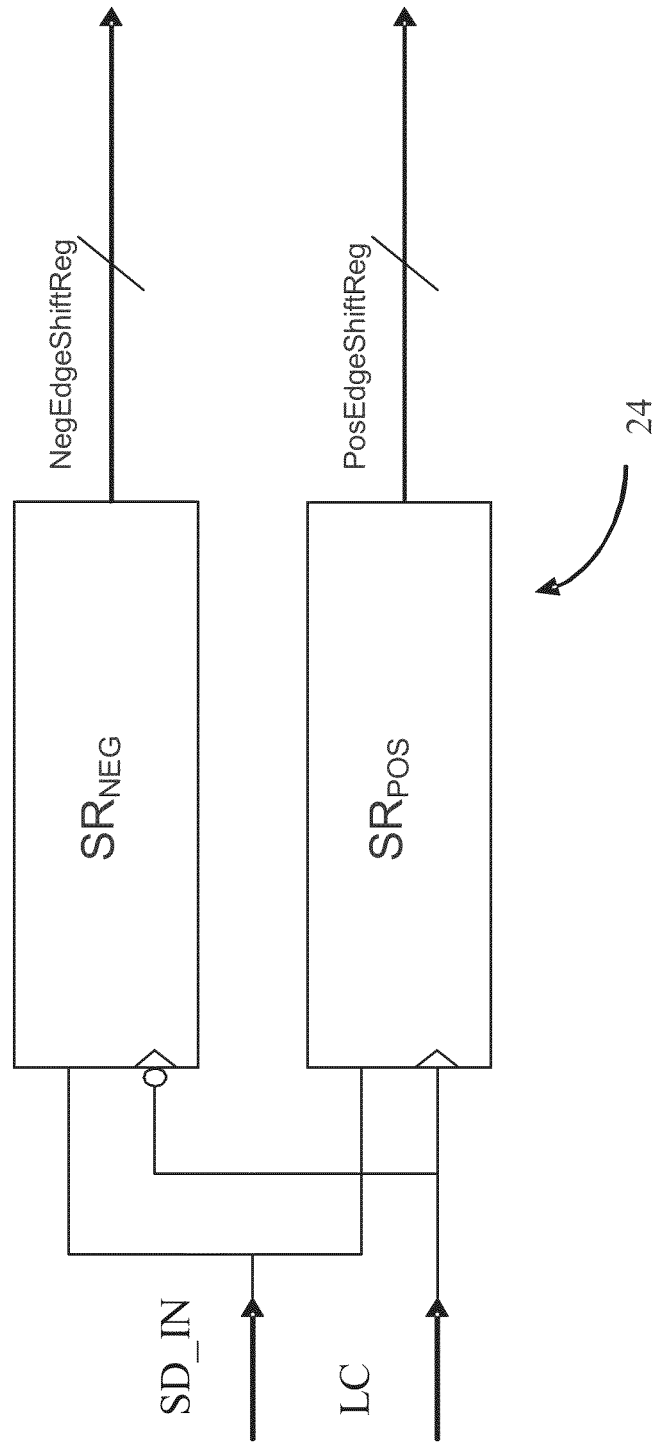
FIG. 7 is a schematic diagram of a data capture module associated with the circuit.
Figure 8:
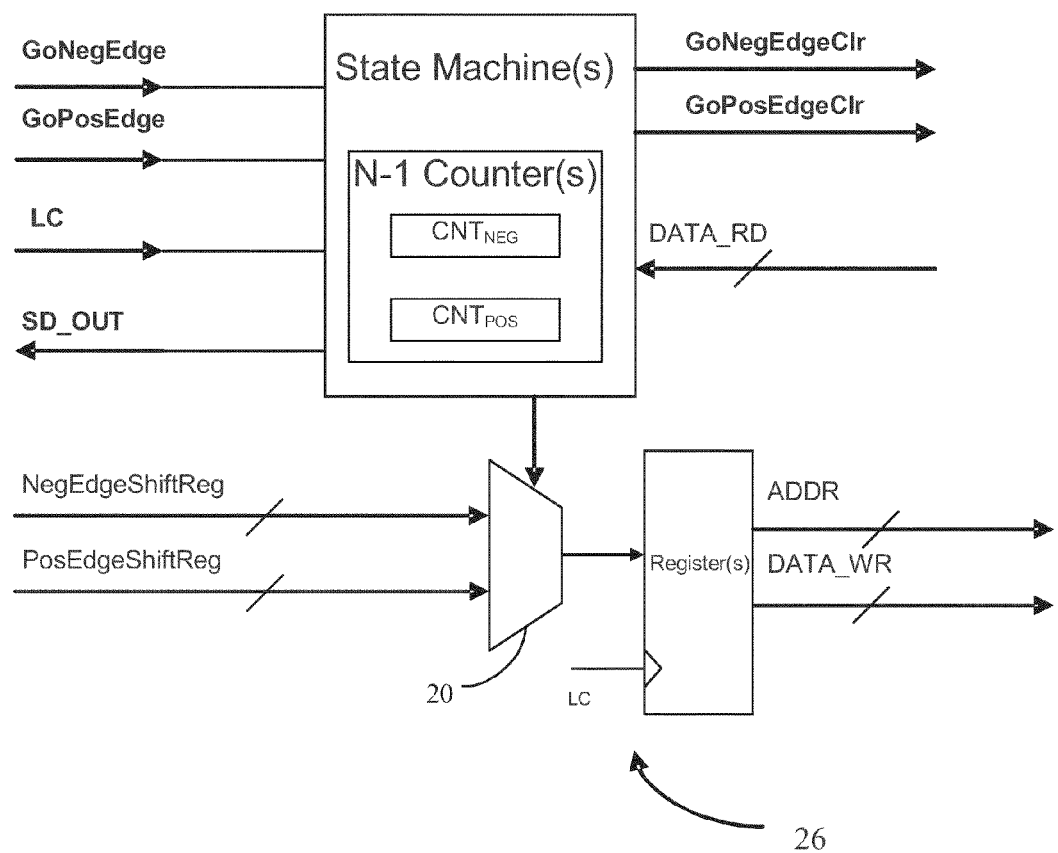
FIG. 8 is a schematic diagram of a state machine associated with the circuit.

Referring now to FIGS. 4-8, a circuit 18 and components thereof are shown for synchronizing data transmissions between master and slave devices 14 and 16 via the SWSI 12. FIG. 4 is a schematic diagram of the circuit 18 according to an embodiment of the disclosure. FIG. 5 illustrates the relationship between the components associated with the circuit 18 in FIG. 4. FIGS. 6-8 depict schematic views of various components associated with the circuit 18. In FIGS. 4 and 5, the SWSI 12 disclosed herein corresponds to the serial data (SD) line. In FIGS. 4-8, the local clock (LC) line corresponds to either the MLC or the SLC. For purposes of convenience, the following discussion with respect to FIGS. 3-7 will generally be limited to a master device 14 communicating with a single slave device 16. As previously discussed, however, the master device 14 may communicate with any number and/or combination of slave devices 16 (e.g., slave devices 16A-16N in FIG. 1). Additionally, although FIGS. 4 and 5 only depict a single circuit 18, skilled artisans will appreciate that the circuit 18 and corresponding components may apply to both, the master device 14 and the slave device 16. In an embodiment, for example, a circuit 18 may be implemented as a master circuit incorporated on the master device 14 side (e.g., on a master chip). Similarly, another circuit 18 may be implemented as a slave circuit incorporated on the slave device 16 side (e.g., on a slave chip). Furthermore, multiple circuits identical or substantially identical to the circuit 18 may be implemented in a multi-slave IC, where each circuit 18 corresponds to a respective slave device 16 within the multi-slave IC.

The circuit 18 comprises a suitable I/O device 20 operable to communicate data between devices 14 and 16, as well as among components associated with a particular device 14 or 16. According to an embodiment, the I/O device 20 may include a multiplexer (MUX) or a bidirectional buffer connected to the SWSI 12. The circuit 18 may further comprise a data analysis module 22, a data capture module 24, and a state machine 26, each of which may be communicatively linked to the I/O device 20. The circuit 18 is configured to control various device operations based on input and output signals communicated via the I/O device 20. As skilled artisans will readily appreciate, the circuit 18 may employ any suitable logic for performing the operations disclosed herein, such as, but not limited to, resistor-transistor logic (RTL), transistor-transistor logic (TTL), complementary metal-oxide-semiconductor (CMOS) logic, diode-transistor logic (DTL), or any combination thereof.

The I/O device 20 may be configured to receive and transmit data and/or command signals, such as the signals listed in Table 1. In an embodiment, when a device 14 or 16 interfaced to the SWSI 12 communicates data, the device 14 or 16 may communicate an output signal (SD_OUT) via the I/O device 20 of the corresponding device. Similarly, the I/O device 20 of the intended recipient 14 or 16 may receive a signal through SD. In turn, the I/O device 20 may transmit an input signal (SD_IN) indicative of the received data to one or more components associated with the circuit 18 of the receiving device 14 or 16.

TABLE 1

| SIGNAL | DESCRIPTION |
| --- | --- |
| SD | Serial data transmitted via SWSI bus |
| LC | Local clock of master device or slave device |
| SD_IN | Serial data input |
| SD_OUT | Serial data output |
| SD_OE | Output enable for serial data output |
| GoNegEdge | Go (sample on) negative edge of LC |
| GoPosEdge | Go (sample on) positive edge of LC |
| GoNegEdgeClr | Clear negative edge (e.g., latches) of circuit |
| GoPosEdgeClr | Clear positive edge (e.g., latches) of circuit |
| NegEdgeSR | Negative edge sampled shift register |
| PosEdgeSR | Positive edge sampled shift register |
| ADDR | Address from shift register |
| DATA_WR | Write data from shift register |
| DATA_RD | Read data |

In an embodiment, the I/O device 20 may communicate SD_IN to the data analysis module 22. The data analysis module 22 is operable to perform one or more operations for analyzing SD_IN. As best shown in FIG. 6, the data analysis module 22 includes at least one delay element 21 or module operable to introduce a delay when a receiving device 14 or 16 is to reconstruct or otherwise recover data contained in SD_IN. While the delay element 21 is shown as including a plurality of invertors, skilled artisans will readily appreciate that the delay element 21 may include additional and/or alternative types of combinational logic suitable for delaying SD_IN. For example, an IC vendor's technology library may be used for implementing logic such as that shown in FIG. 6. In one aspect, such a library may comprise a variety of delay elements 21 that may be selected, where each delay element 21 may be characterized by a different time delay from its input to its output.

Upon receiving data via SD, the I/O device 20 may pass SD_IN through the delay element 21. The delay element 21 is operable to delay SD_IN for a sufficient duration that enables the data analysis module 22 to determine a clock edge based on LC (MLC or SLC). As discussed further below, the delay element 21 is configured to delay SD_IN relative to the LC, such that the delay element 21 may ensure that sufficient time is available during a clock cycle to recover data from SD_IN. Furthermore, the delay element 21, in conjunction with $AND_1$, operate as a noise filter on SD_IN.

In an embodiment, the data analysis module 22 includes circuitry for detecting a clock edge. As used herein, a "clock edge" may refer to a rising edge or a falling edge of the LC. According to one aspect, the data analysis module 22 may determine a clock edge by sampling SD_IN. As previously discussed, a data frame such as SD_IN, for example, may begin with a SYNC bit for allowing a receiving device 14 or 16 to synchronize a data transmission using its MLC or SLC. In an embodiment, the data analysis module 22 of a receiving device 14 or 16 may sample a SYNC bit contained in SD_IN to determine a sampling edge based on the clock edge. As used herein, a "sampling edge" refers to a clock edge that is used to sample data received via SD. For instance, a sampling edge for a master device 14 refers to a rising or falling edge of the MLC, and a sampling edge for a slave device 16 refers to a rising or falling edge of the SLC.

Those of ordinary skill in the art will understand that the data analysis module 22 may employ any suitable circuitry and logic for analyzing SD_IN. In one aspect, for example, the data analysis module 22 may include AND gates $AND_1$, $AND_2$, and $AND_3$, OR gates $OR_1$, $OR_2$, and $OR_3$, and registers such as positive edge clocked flip-flops $FF_1$ and $FF_2$. The data analysis module 22 may also include AND gates $A_{INV1}$, $A_{INV2}$, $A_{INV3}$, and $A_{INV4}$ and registers such as negative edge clocked flip-flops $FF_{INV1}$ and $FF_{INV2}$ each having inverting inputs, respectively (as denoted by the bubbles of their respective inputs). In FIG. 6, the upper half of data analysis module 22 pertains to logic for determining whether to sample data on the negative or falling edge of the LC, and the bottom half of the data analysis module 22 pertains to logic for determining whether to sample data on the positive or rising edge of the LC. Further, if the data analysis module 22 decides to sample data on the negative edge of the LC, the logic pertaining to sampling data on the positive edge may be disabled, and vice-versa.

As discussed above, the data analysis module 22 may sample a SYNC bit contained in SD_IN in order to determine which edge of the LC to sample data. Therefore, after SD_IN passes through the delay element 21, the data analysis module 22 may analyze the SYNC bit using the logic shown in FIG. 6, for example. Based on the analysis of the SYNC bit, the data analysis module 22 may generate a signal (GoNegEdge or GoPosEdge) that indicates whether data should be sampled on the negative (falling) or positive (rising) edge of LC.

As shown in FIGS. 4, 5, and 7, the circuit 18 may include a data capture module 24 operable to reconstruct or otherwise recover data transmitted via SD. In an embodiment, the data capture 24 module may be operable to recover data in accordance with an output generated by the data analysis module 22. For instance, if the data analysis module 22 outputs GoNegEdge, the data capture module 24 may recover data from SD_IN on the negative edge of the LC. Similarly, if the data analysis module 22 outputs GoPosEdge, the data capture module 24 may recover data from SD_IN on the positive edge of the LC. Those versed in the art will appreciate that the data capture module 24 may include one or more suitable shift registers for storing data, e.g., address bits, data bits, etc.

According to an implementation, the data capture module 24 may include a negative edge shift register $SR_{NEG}$ for storing data recovered on a negative edge of LC, and a positive edge shift register $SR_{POS}$ for storing data recovered on a positive edge of LC. Those versed in the art will readily appreciate that recovering a transmitted data frame in the shift registers $SR_{NEG}$ and $SR_{POS}$ may require multiple, sequential edges of the selected edge (negative or positive) of the LC. For example, the data capture module 24 may use eight sequential negative edges of the LC to capture address bits A7-A0 of the data frame if the data analysis module 22 has determined to use negative edge sampling (GoNegEdge is asserted active) on SD_IN.

In an embodiment, the circuit 18 may include a suitable state machine 26 (FIG. 8) operable to monitor the status of communications over SD. The state machine 26 may include one or more counters. According to an implementation, the state machine 26 may include a negative counter $CNT_{NEG}$ and a positive counter $CNT_{POS}$ for tracking data shifted into and out of $SR_{NEG}$ and $SR_{POS}$, respectively. Additionally or alternatively, the counters $CNT_{NEG}$ and $CNT_{POS}$ may be configured to assert for one clock cycle. Further, after a particular data transmission is complete, the circuit 18 may communicate signals (GoNegEdgeClr and GoPosEdgeClr) for clearing or resetting circuit components (e.g., flip-flops, counters, etc.) in order to capture a new SYNC bit when a subsequent SD_IN is received. In one aspect, the state machine 26 may include additional state logic (e.g., in addition to the $CNT_{NEG}$ and $CNT_{POS}$ counters) to implement other features such as the bus turnaround during and/or after a read, and/or additional control logic to deliver write data and accept read data.

It is to be understood that the circuit 18 and corresponding components disclosed herein are merely intended for purposes of illustration. Therefore, the circuit 18 should not be construed as being limited in any particular way, as skilled artisans will readily appreciate that the circuit 18 may employ any variety of suitable algorithms, components, and techniques. For instance, the circuit 18 may employ additional or alternative components and techniques, such as, but not limited to, oscillators, resistors, capacitors, transistors, latches, flip-flops, inverters, multiplexers, relays, cross-coupling combination gates, tri-state drivers, tri-bus techniques, combinatorial logic, etc.

Figure 9A:
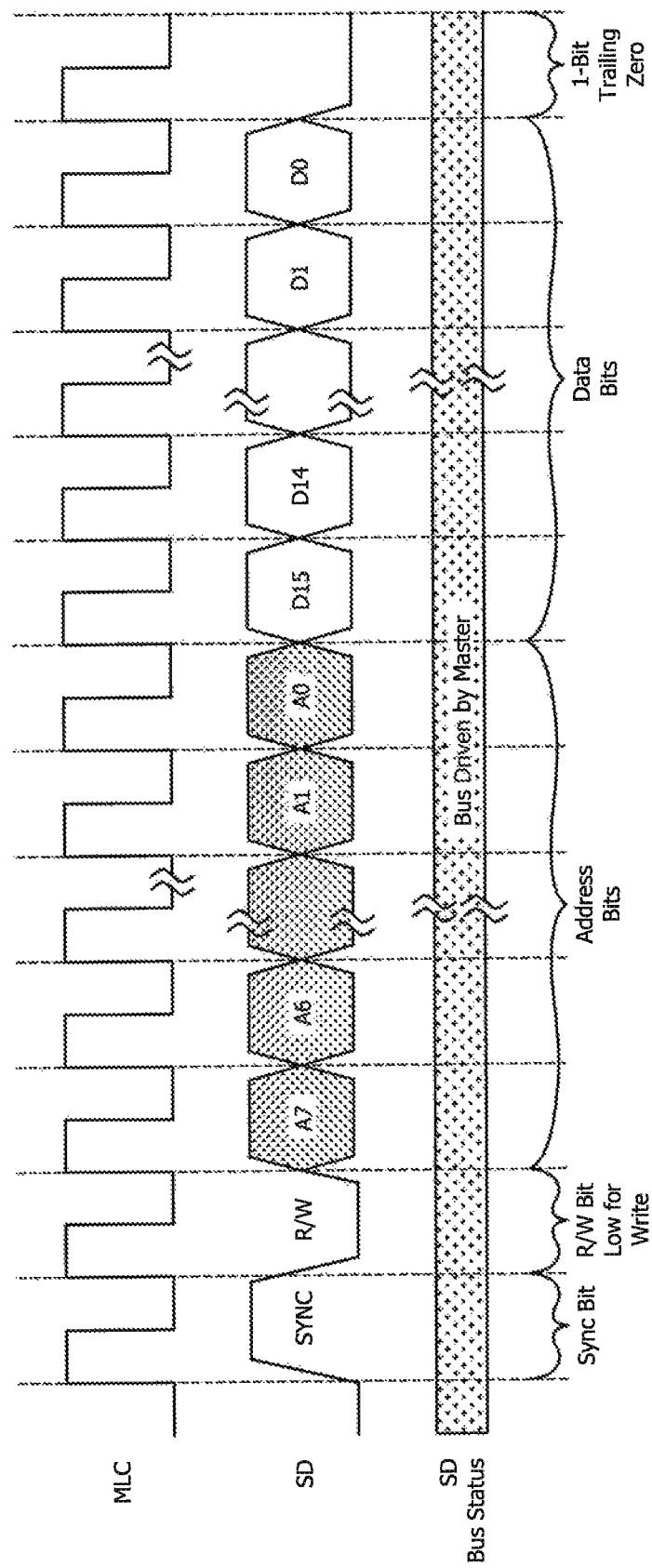
FIG. 9A is a timing diagram of a write operation based on a master device perspective.
Figure 9B:
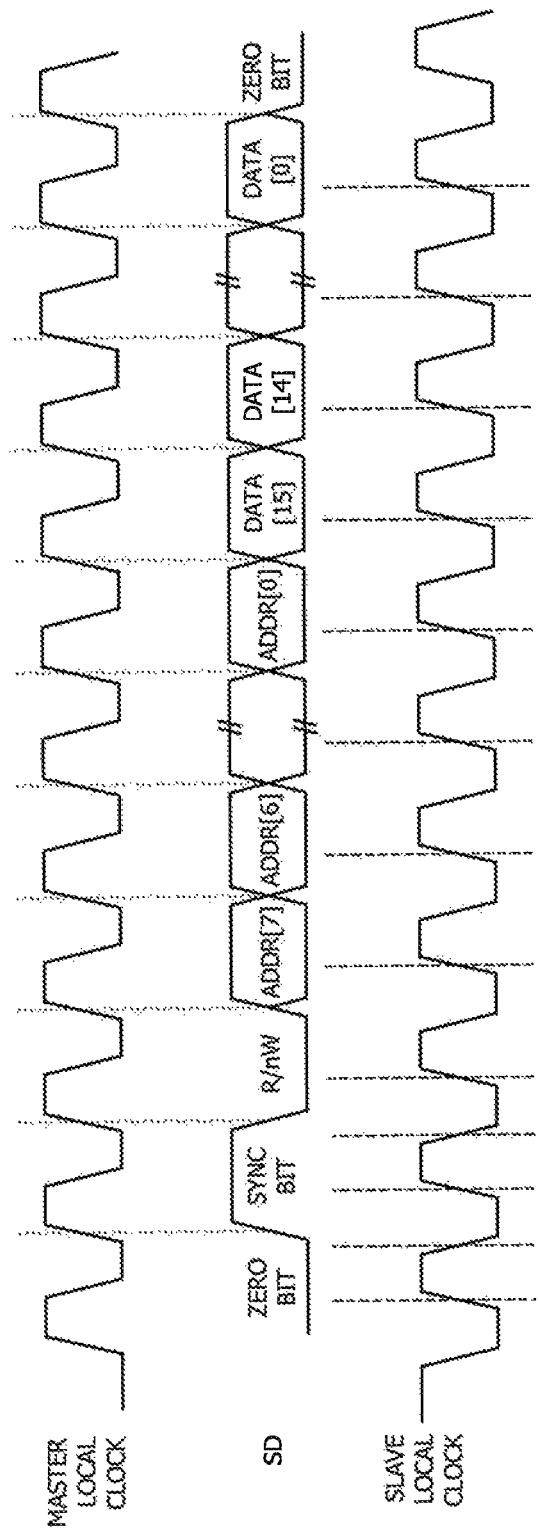
FIG. 9B is a timing diagram illustrating waveforms corresponding to a master device and a slave device performing the write operation in FIG. 9A.
Figure 10A:
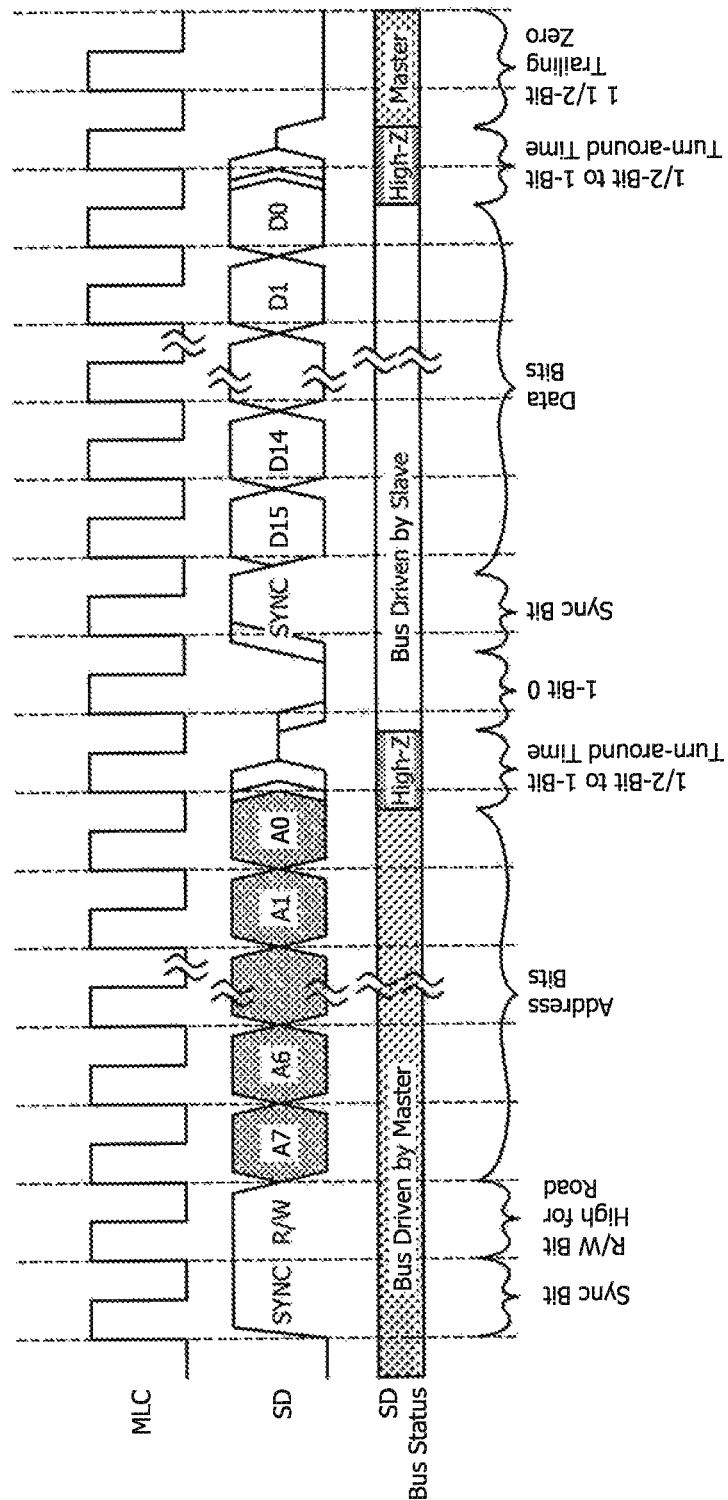
FIG. 10A is a timing diagram of a read operation based on a master device perspective.
Figure 10B:
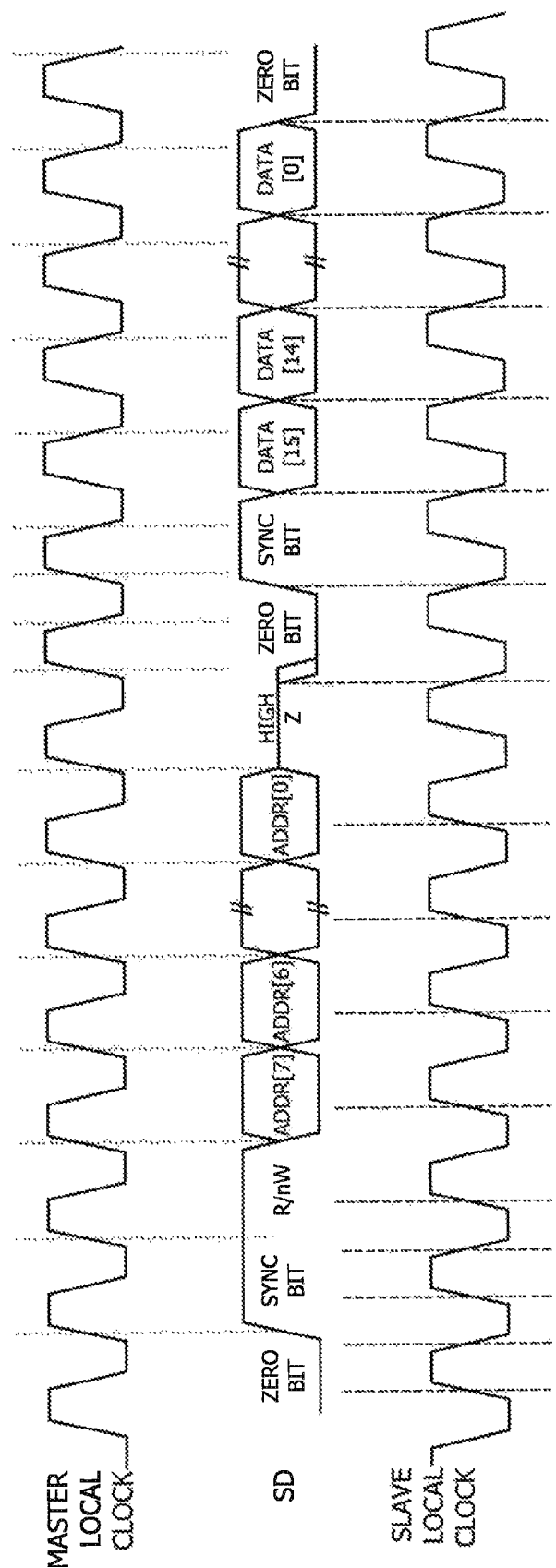
FIG. 10B is a timing diagram illustrating waveforms corresponding to a master device and a slave device performing the read operation in FIG. 10A.

Referring now to FIGS. 9A, 9B, 10A, and 10B, timing diagrams are illustrated for "write" and "read" transfers, respectively. The timing diagrams illustrate an example of a master device 14 communicating with a slave device 16 through a SWSI bus 12, which is denoted by SD. FIGS. 9A and 10A illustrate the status of SD—from the perspective of the master device 14—during a write transfer and a read transfer, respectively. FIGS. 9B and 10B illustrate waveforms corresponding to the master device 14 and the slave device 16 during the write and read transfers, respectively. In particular, FIGS. 9B and 10B illustrate, from the perspective of the master device 14 and the slave device 16, both the launching and sampling of data using their respective LCs. The timing diagrams are based on data transmissions comprising one SYNC bit, one R/W bit, eight address bits (A7-A0), and sixteen data bits (D15-D0). The dotted vertical lines in the timing diagrams of FIGS. 9B and 10B denote the points at which data is launched and/or sampled by the master device 14, while the dashed vertical lines in FIGS. 9B and 10B denote the points at which data is either launched or sampled by the slave device 16. As shown at the beginning and end of the waveform corresponding to SD, the SWSI bus 12 is held low (e.g., zero or ground) when the master device 14 and the slave device 16 are not transmitting data over SD.

An example of a write transfer will first be described with reference to FIGS. 9A and 9B. In an embodiment, the master device 14 may drive SD and initiate communication with a slave device 16 by transmitting a data frame including a SYNC bit, followed by an R/W bit. In the present example, the R/W bit is zero (low) when the master device 16 performs a write transfer. The master device 16 may transmit address bits A7-A0 specifying an address, which are followed by a stream of data bits D15-D0. At the end of the write transfer, the master device 16 may drop SD to low.

FIGS. 10A and 10B depict an example of a read transfer, in which case the R/W bit is one (high). During a read transfer, the slave device 16 is operable to reconstruct data transmitted by the master device 14. According to one aspect, the slave device 16 may be configured to monitor SD for incoming data. Upon detecting or otherwise becoming aware of data transmitted by the master device 14 through SD, the slave device 16 may initially sample the SYNC bit in order to synchronize a data transmission. For instance, the slave device 16 determines which edge of the SLC to sample the following address A7-A0 bits by sampling the SYNC bit.

As previously discussed, the slave device 16 includes circuitry (e.g., circuit 18 and components thereof) operable to introduce a delay for allowing the slave device 16 to determine a sampling edge. In an embodiment, the introduction of a delay operates to back up the transmitted data relative to the SLC, such that the slave device 16 may determine which edge (rising or falling) of the SLC to sample data based on only one clock edge. The delay helps ensure that the transmitted data will not be too close to the sampling edge when the slave device 16 samples the transmitted data. Stated differently, when the slave device 16 is to sample data that is transmitted thereto, the transmitted data is delayed so that the slave device 16 has sufficient time to sample the transmitted data on the edge of the SLC that is selected as the sampling edge. As a result, the slave device 16 may successfully capture the data transmitted via SD.

Returning to FIGS. 10A and 10B, after the slave device 16 samples the SYNC bit and reads the address bits A7-A0, the slave device 16 may begin to transfer data bits D15-D0 stored in a corresponding shift register (e.g., similar to $SR_{NEG}$ or $SR_{POS}$), as requested by the master device 14. As best shown in FIG. 10A, a "turn-around time" may be implemented to ensure that the slave device 16 has enough time to finish sampling data and that the master device 14 is given enough time to prepare for receiving data. Those versed in the art will appreciate that the implementation of an adequate turn-around time may eliminate or reduce the risk of conflicts between the master device 14 and the slave device 16. In an embodiment, the turn-around time may range anywhere from about a one-half bit turn-around time to a one-bit turnaround time. The duration of the turn-around time is dependent on whether the slave device 16 selects the rising edge or the falling edge of the SLC to recover data. After the slave device 16 samples address bit A0, the slave device 16 may wait for a certain period of time (e.g., one-and-a-half clock cycles) before driving SD on either a rising or falling clock edge. In FIG. 10A, it can be seen that the slave device 16 may drive SD low for a "1-bit zero time" before outputting a SYNC bit and the following data bits D15-D0. Subsequently, another turn-around time may be implemented for enabling the master device 14 to resume control of SD and may drive SD low. Additional details regarding the implementation of a turn-around time are discussed below in connection with FIGS. 11A-11C.

When receiving data from the slave device 16, the master device 14 may be configured in a listening mode where it is operable to detect the SYNC bit transmitted by the slave device 16. According to one aspect, the master device 14 may be operable to always drive a data frame on SD on either, the rising edge of the MLC or on the falling edge of the MLC. According to another aspect, the master device 14 may be operable to drive SD on different clock edges during consecutive data frame transmissions. In a similar manner, the slave device 16 may transmit read data to the master device 14 on consecutive positive clock edges or consecutive negative clock edges.

In an embodiment, the master device 14 may not begin sampling SD until one-and-a-half clock cycles have passed since the master device 14 has tri-stated SD. Hence, the master device 14 may not detect the SYNC bit any sooner than two clock cycles after tri-stating SD. Furthermore, although the SLC and MLC are configured to run at the same or similar frequencies, it may not be possible to ensure that the SLC and MLC will rise/fall on similar clock edges because the SLC and MLC may be out-of-phase. Therefore, upon detecting the SYNC bit, the master device 14 may re-synchronize the data transmitted by the slave device 16. As skilled artisans will readily appreciate, the master device 14 may reconstruct the transmitted data in a substantially similar manner as described with respect to the slave device 16. For instance, a similar type of delay may be introduced (e.g., using circuit 18) for enabling the master device 16 to determine a sampling edge based on a single edge of the MLC. Accordingly, the master device 16 may sample the SYNC bit in order to determine whether to sample data transmitted by the slave device 16 on the falling or rising edge of the MLC.

Based on the timing diagrams shown in FIGS. 9A, 9B, 10A, and 10B, it can be seen that a common clock is not necessary for transmitting data via SD between the master device 14 and the slave device 16. Instead, each device 14 and 16 may employ a single clock (MLC and SLC) in order to synchronize the transmission of data. Moreover, by introducing a delay, the master and slave devices 14 and 16 may each determine an appropriate sampling edge based on one edge of the MLC or SLC, respectively. As a result, devices 14 and 16 may communicate data through SD at a full clock rate, such that each bit (e.g., A7-A0 and D15-D0) in a data frame may be transmitted and recovered per clock cycle, as shown in the timing diagrams.

The timing diagrams in FIGS. 9A, 9B, 10A, and 10B further illustrate that the MLC and SLC are in frequency with each other, but not necessarily in phase with each other. As previously discussed, the MLC and SLC may be configured to have either the same frequency, or frequencies sufficiently close to one another (e.g., within a predetermined frequency range). By configuring the MLC and SLC accordingly, it is not necessary to employ a common clock for synchronizing data transmissions. Consequently, the master device 14 and the slave device 16 do not need to transmit clock signals (e.g., based on a common clock) that may otherwise increase power usage and noise.

While a master device 14 and a slave device may each employ a similar circuit 18 for synchronizing data transmissions, those familiar in the art will appreciate that different circuitry and/or logic may be employed for the master device 14 and the slave device 16. In an embodiment, for example, a master interface may be designed for a master device 14 and a different slave interface may be designed for a slave device 16.

Figure 11A:
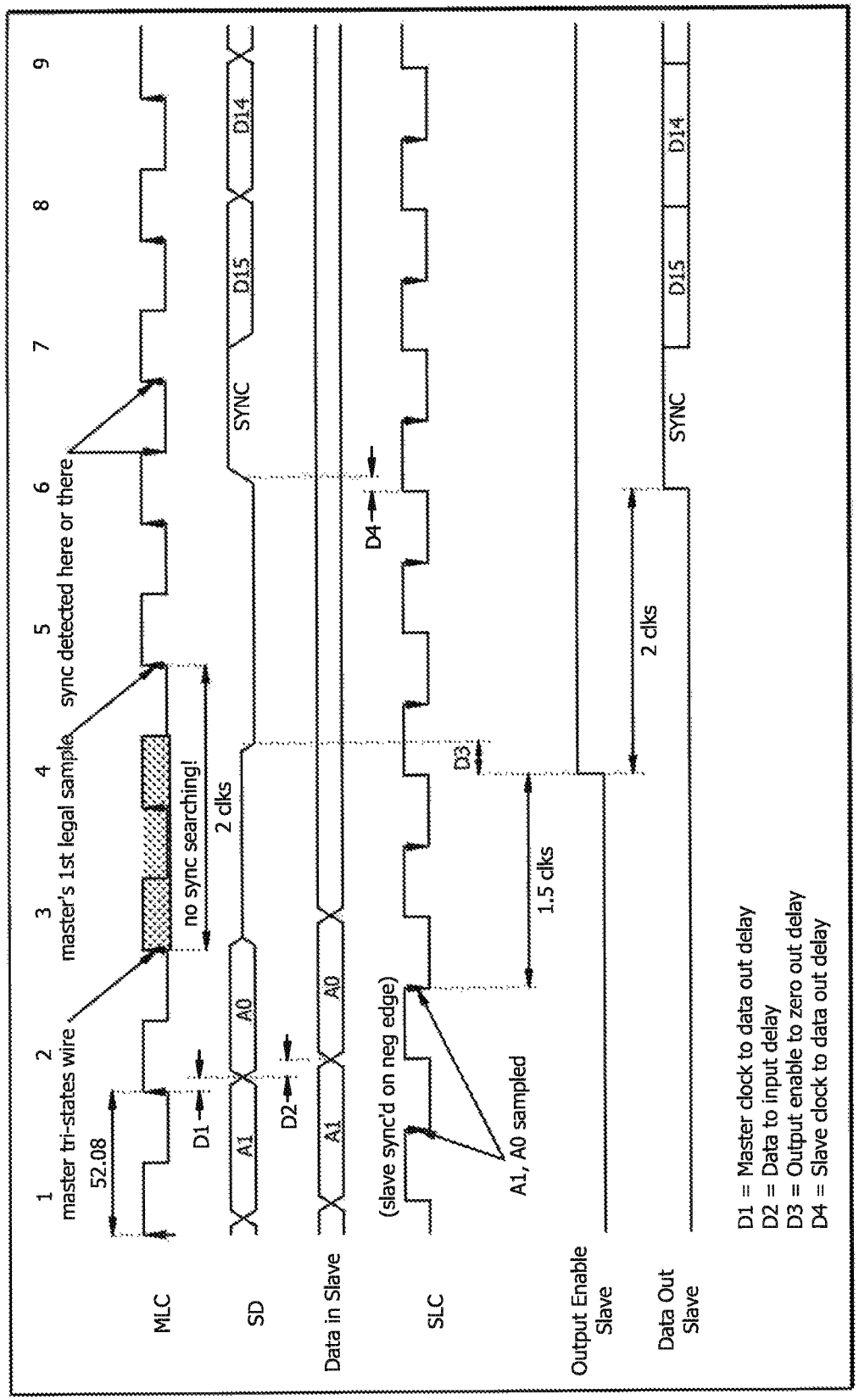
FIGS. 11A-11C are timing diagrams illustrating waveforms based on embodiments of the present disclosure.
Figure 11B:
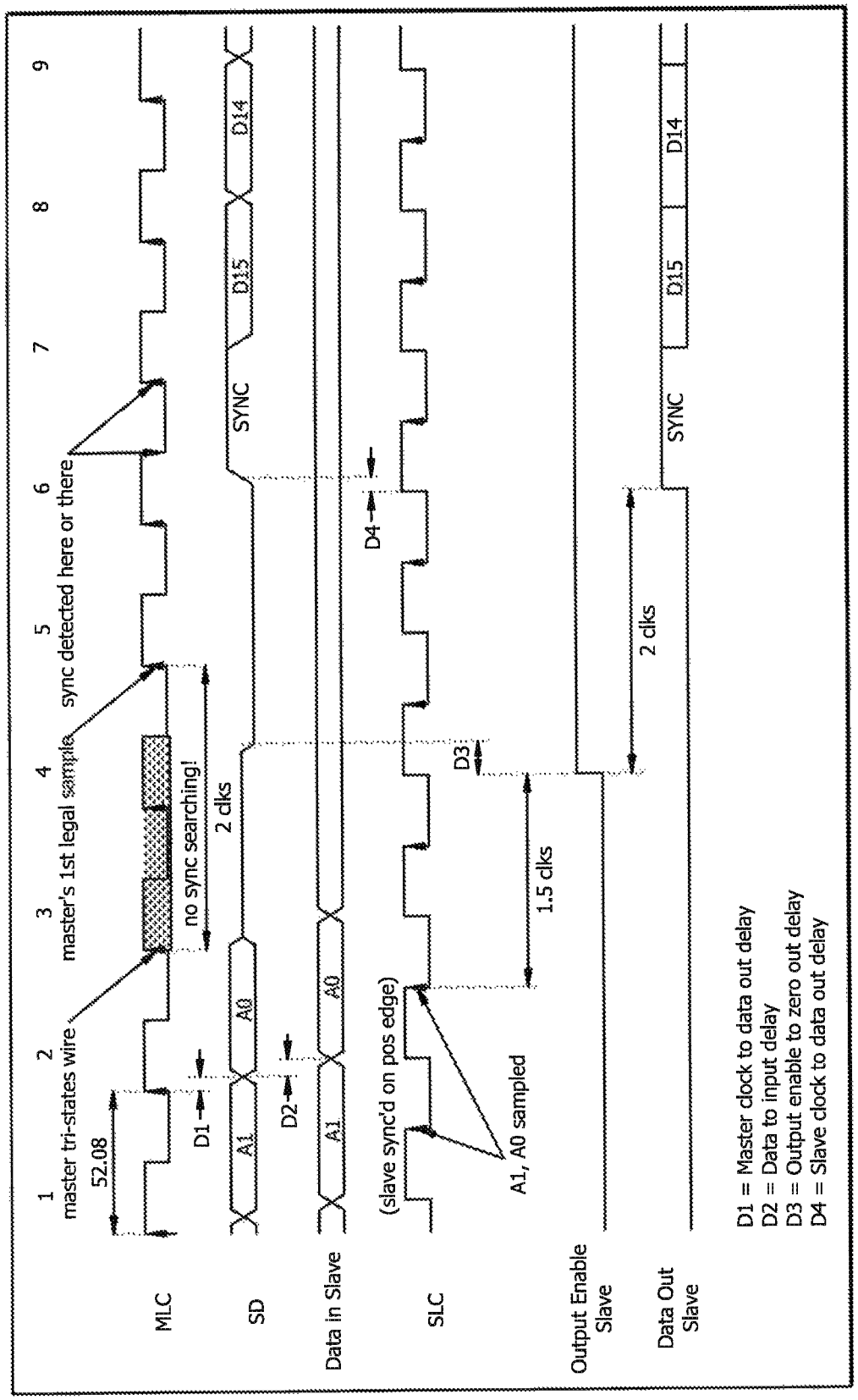
Figure 11C:
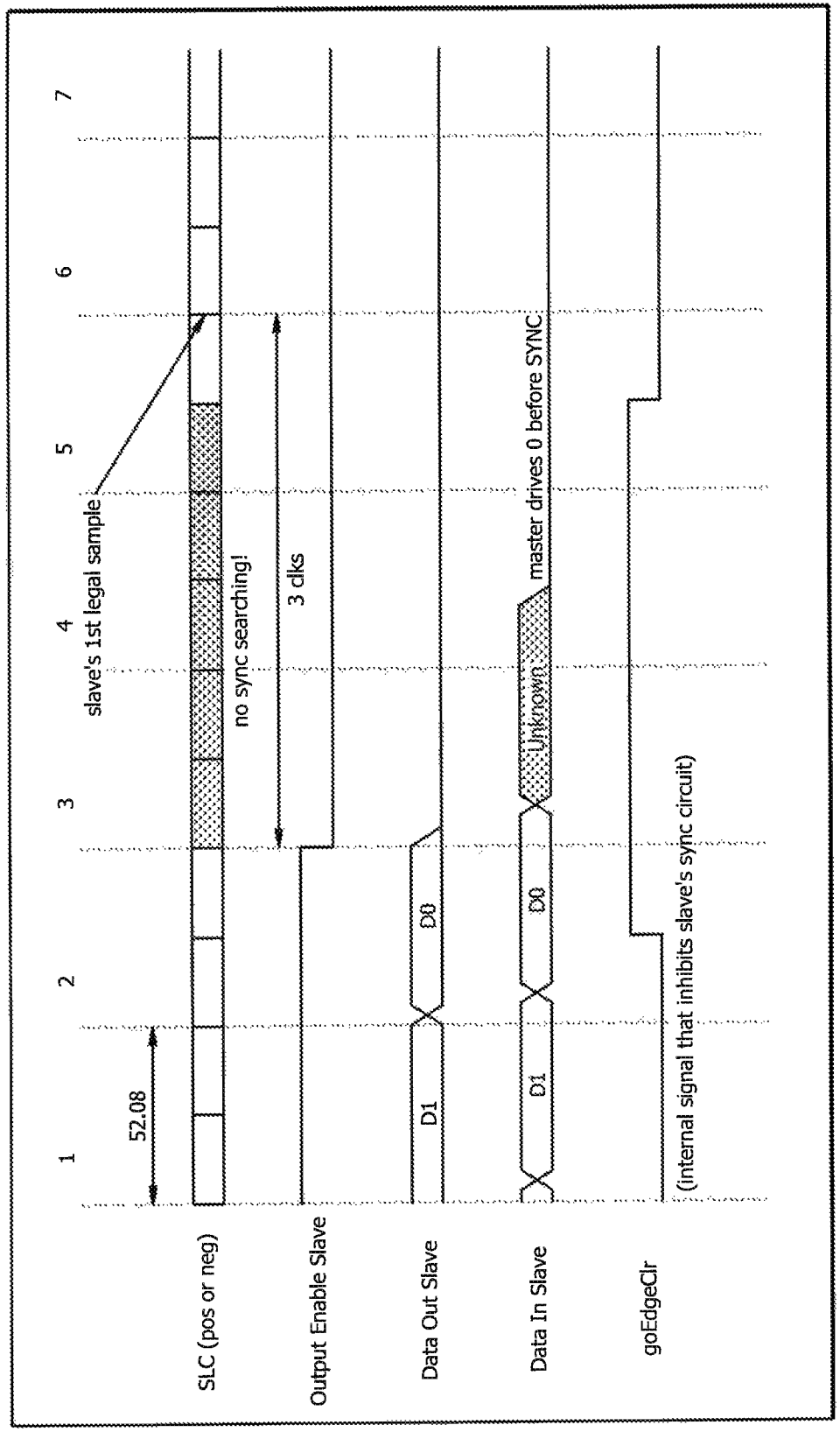

FIGS. 11A-11C illustrate timing diagrams based on embodiments where a turn-around time is implemented for transmitting data packets via the SWSI 12. The timing diagrams in 11A-11C are based on a SLC with a 50% duty cycle. A 40/60 or 60/40 percent duty cycle would slightly increase the 0.5 clock delta. As discussed below, however, this increase may be accounted for by employing a three-clock lockout mechanism disclosed herein.

Referring first to FIGS. 11A and 11B, the turn-around relationship is shown between a master device 14 communicating with a slave device 16 via the SWSI 12 (denoted by SD) after address bit A0 is sent, and when SYNC bit and data bits D15-D0 are read. In FIG. 11A, the slave device 16 has synchronized up to the address portion of the data packet corresponding to the master device 14 using the negative edge of the SLC. In FIG. 11B, the slave device has synchronized up to the address portion of the data packet corresponding to the master device 14 using the positive edge of the SLC.

Both timing diagrams illustrate a timing constraint of two cycles before the master device 14 can begin acquiring data from the slave device 16 after the master device 14 has tri-stated SD. The timing diagrams also show that the slave device 16 may not transmit a SYNC bit until two clocks after enabling SD (e.g., this may be due to the negative or positive synching edge of the SLC and an internal interface with a register map). However, the slave device 16 may always enable SD 1.5 clocks after capturing the last address bit A0.

FIGS. 11A and 11B show a symmetrical timing relationship between slave devices 16 synchronized on the negative clock edge and slave devices 16 synchronized on the positive clock edge. In both cases, the bus turnaround time is 1.5 clocks, and the transmission of the data portion of the packet back to the master device 14 starts two clocks after. These timing relationships for the turnarounds are generally based on one implementation. Skilled artisans will readily recognize that other turnaround timings may be realized in other implementations. Generally, however, the "handshake" relationship between the master device 14 and the slave device 16 should be agreed upon. Otherwise, for example, the master device 14 can drop a SYNC bit or obtain a false SYNC bit. Either way, the data packet can be missed or misinterpreted, which may result in the slave device 16 becoming permanently out of sync with the master device 14.

Referring now to FIG. 11C, the turn-around is shown for the slave device 16 after data bit D0 is sent and when the slave device 16 begins searching for the next data packet transmitted from the master device 14. The timing diagram illustrates that the turn-around signaling is the same regardless of which edge (positive or negative) of the SLC that slave device 16 has selected to synchronize data transmissions. The timing constraint before the slave device 16 can begin acquiring a new data packet from the master is shown as three clocks after the slave device 16 tri-states the SWSI 12. This is asymmetrical from way the master device 14 and the slave device 16 switch SWSI 12 between the last address bit A0 and the SYNC bit preceding the first data bit D15 (two clocks). In other implementations, a two-clock turnaround time may be used instead of the three-clock turnaround time used in this example. FIG. 11C also includes a goEdgeClr waveform, which corresponds to a signal that is internal to the slave device 16. Based on the goEdgeClr waveform, it can be seen that the slave device may inhibit its synching circuitry (e.g., data analysis module 22) during a turn-around time. Those skilled in the art will readily appreciate that the master device may have a similar internal signal for controlling its synching circuitry between bits A0 and D15.

Figure 12:
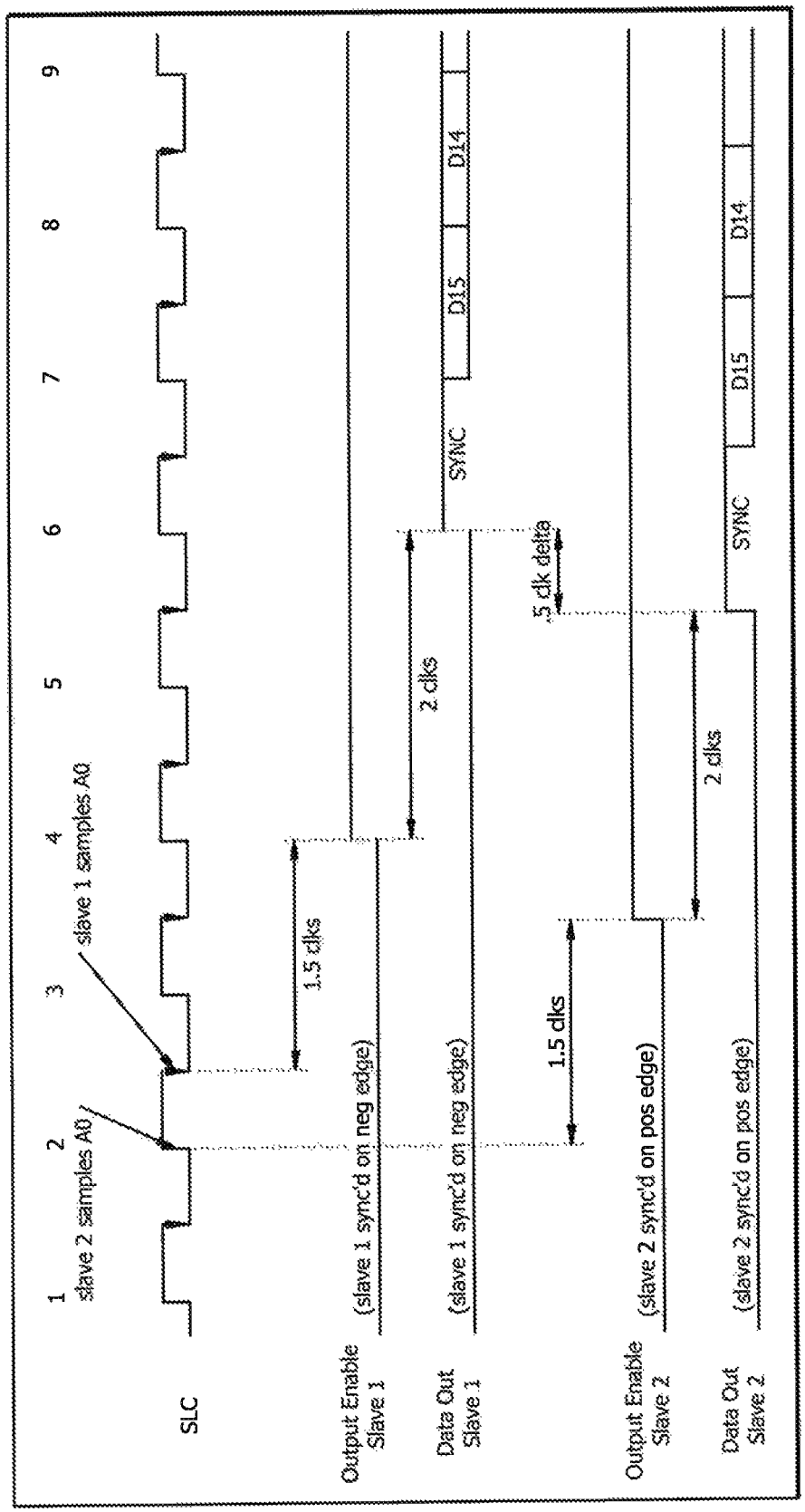
FIG. 12 is a timing diagram illustrating a waveform based on an embodiment of the present disclosure.

Referring now to FIG. 12, an example will be described in which two or more slave devices 16 are configured as slave modules (denoted as slave 1 and slave 2). As previously mentioned, two or more slave modules 16 may be implemented on a common IC and participate in data transmissions using a single external SWSI 12 (denoted as SD). In a multi-slave implementation, all slave modules should generally remain in sync with a master device 16 at the end of a read transfer. FIG. 12 illustrates a situation where one slave module (slave 1) is locked using a negative clock edge, and a second slave module (slave 2) is locked using the positive clock edge. In FIG. 12, slave 1 and slave 2 are implemented within the same IC, where both use the same reference clock (SLC) and have the same phase. For simplicity, only two slave modules 16 are described in this example, yet skilled artisans will readily appreciate that the results are similarly applicable in implementations comprising more than two slave modules 16. Similarly, while the example is based on each slave module 16 locking within one-half of a clock apart from each other, similar results may be realized in other situations. Those versed in the art will recognize that the one-half clock-locking differential between the slave modules 16 is relatively reasonable in low frequency systems (e.g., 19.2 MHz or 52 MHz).

Prior to discussing the timing diagram of FIG. 12 in detail, a few items are noted. For instance, slave 1 and slave 2 may each employ any suitable selection mechanism so that only one of the slave modules 16 (slave 1 or slave 2) responds to a master device 14 with data. Additionally, the implementation in FIG. 12 may be used to pick off several leading address bits such as bits A7 and A6, for example, which are decoded early enough to select a specific slave module (slave 1 or slave 2). In this case, the two address bits allow for the possibility of four slave modules 16 that implement read transfers. While the selected slave module 16 completes a read transfer to the master device 14, the non-selected slave modules 16 also complete "virtual" read transfers. Skilled artisans will recognize that a relatively simple implementation (e.g., less wires and less control) may be realized by keeping the non-selected slave modules 16 synchronized with the master device 14. Although the non-selected slave modules 16 may each run through a substantially same state machine process as the selected slave module 16, the decoded select signal is used to gate off the non-selected slave modules' internal data bus, whereas the selected slave module's bus is gated on by its decoded select signal. This approach eliminates the need for cross-coupling signals between slave modules 16 and/or the need for more complex controls. Those familiar in the art will readily appreciate that the aforementioned features may be similarly extended to multi-slave ICs.

FIG. 12 illustrates a timing diagram based on a multi-slave "read" transfer, where there is a one-half clock differential between slaves 1 and slave 2 at the end of the read transfer. Several observations from the timing diagram will now be discussed. In cases where the master device 14 is reading data from slave 2, which is locked on the positive clock edge of the telegram (e.g., a data telegram), only slave 2 is selected. As mentioned above, however, although slave 1 not selected, slave 1 tracks the telegram to stay in sync with SD (i.e., the SWSI 12). In this case, slave 1 has locked onto the negative clock edge of the telegram. At the end of the telegram, slave 1 is 0.5 clocks behind slave 2. Thus, the master device 14 needs to wait for a sufficient time before sending the next SYNC pulse. Otherwise, slave 1 may miss the start of the next telegram. Further, the master device 14 can still drive SD low (e.g., "logic 0," "low state," "low voltage," etc.) early enough for slave 2 without interfering with slave 1 because slave 1 is not yet looking for a SYNC pulse and slave 1 is not driving SD.

In cases where the master device 14 is reading from slave 1, which is locked onto the negative clock edge of the telegram, slave 1 is selected and slave 2 is not selected. Similar to the first case described above, slave 2 is configured to track the telegram to stay in sync with SD. In this case, slave 2 has locked onto the positive edge of the telegram. At the end of the telegram, slave 1 is again 0.5 clocks behind slave 2, yet measures should be taken to ensure that slave 2 does not detect an early SYNC pulse. This may be accounted for using an end-of-read lockout time (e.g., as shown in FIG. 11C). The master device 14 again needs to wait for a sufficient time before sending the next SYNC pulse, but the master device 14 also needs to drive SD low early enough for slave 2.

In cases where slave 1 and slave 2 lock onto the same clock edge (either positive or negative), no problems or serious issues are presented because slaves 1 and 2 will have exactly or substantially the same timing. However, one issue generally present in read cases such as these concerns the bus turnaround at the end of a read operation. As noted above, all slave modules 16 (e.g., slave 1 and slave 2) should remain synchronized with a master device 14 in order for subsequent reads or writes to perform properly. By implementing a three-cycle lockout in each slave (e.g., as in FIG. 11C), skew between slaves modules 16 may be accounted for. A three-clock lockout is generally conservative for a one-half clock skew system because it allows for up to about one clock of skew to be tolerated. Further, the present example illustrates that the master device 14 can drive the bus to "0" (drive SD low) to satisfy all slave modules 16 before a SYNC pulse is sent.

The embodiments discussed above with respect to FIGS. 11A-11C and FIG. 12 generally focused on "read" operations. "Write" operations such as master writes are relatively simpler, despite a similar potential of about a one-half clock skew between slave devices 16. That is, since the master device 14 is always driving SD (i.e., the SWSI 12), no turnaround is needed at the end of a write operation. At the end of a write, and after D0 is sent, SD is driven low ("0") without any break. However, the master device 14 still needs to wait for a sufficient time (e.g., one or one-half clock) before starting the next write or read packet. Furthermore, multiple slave devices 16 can process writes simultaneously, whereas only one slave device 16 can usually respond to a read.

In an embodiment, all of the turnaround delays discussed herein are optionally programmed and selected in a master implementation (configuration register). In one aspect, programmable values may be included in a three-bit field corresponding to delay time after launching address bit A0 until the master device 14 starts looking for a SYNC bit from a slave device, where the values may comprise: 2.5 clocks, 3.0 clocks, 3.5 clocks, etc. Additionally or alternatively, programmable values may be included in a three-bit field corresponding to delay time after latching data bit D0 until the master device 14 re-asserts and drives the SWSI bus 12 low ("0"), where the values may comprise: 1.0 clock, 1.5 clocks, 2.0 clocks, etc. Additionally or alternatively, programmable values may be included in a three-bit field for read delay gap after latching D0 until starting the next telegram, where the values may comprise: 1.5 clocks, 2.0 clocks, 2.5 clocks, etc. Additionally or alternatively, programmable values may be included in a three-bit field for write delay gap after launching D0 until starting the next telegram, where the values may comprise: 2.0 clocks, 2.5 clocks, 3.0 clocks, etc. Furthermore, one or more slave devices 16 may be similarly programmed by implementing an interface register. Briefly, for example, an interface register may be programmed during a first write transfer to the slave device(s) 16. The programmed values may be configured to take effect after the write, in time for any subsequent telegrams.

Those familiar in the art will appreciate that various factors in a system (e.g., system 10) in which the SWSI 12 is employed may affect data transmissions over the SWSI 12. For instance, as voltage in a system decreases while temperature increases, the actual delay through the delay module 21 may increase. Therefore, simulations may be conducted to ensure that time delays generated by the delay module 21 are satisfactory in light of system changes such as process, voltage, and temperature (PVT). The following discussion describes a method for calculating a delay time of the delay module 21, which may be selected and/or constructed accordingly to any suitable manner for enabling performance of the features disclosed herein. As skilled artisans will understand, for example, various types of logic from an ASIC foundry technology library may be employed. In one aspect, a best-case time delay ($DLY_{BC}$) based on "best-case" operating conditions may be used to determine a delay element or module 21. In a non-limiting example, the time delay may be calculated using the following equation:

$$DLY_{BC} > t_{WCSU} + t_{WCDataSkew} + t_{WCJit} + t_{WCClkSkew},$$

where:

$t_{WCSU}$ represents a worst-case flip-flop setup time of the first entries of the two data capture shift registers (SRs), e.g., data captured via shift registers $SR_{NEG}$ and/or $SR_{POS}$;

$t_{WCDataSkew}$ represents a worst-case time skew between SD_IN fan-outs;

$t_{WCJit}$ represents a worst-case time regarding clock jitter (e.g., jitter of the LC), which may be used to ensure accurate bit-to-bit samplings (e.g., data sampled on an edge of LC during one cycle and a subsequent cycle); and $t_{WCClkSkew}$ represents a worst-case time regarding LC skew between edge detection (e.g., via data analysis module 22) and data capture SRs.

There may be instances where $t_{WCSU}$ actually represents a best-case setup for the flip-flops. Nonetheless, it may be necessary to ensure that a worst-case scenario is accounted for as time delays may scale in accordance with PVT changes. Therefore, worst-case scenarios may be assumed. In a relatively conservative and non-limiting example, ($DLY_{BC}$) may be calculated using the equation above and the following parameters:

$t_{WCSU}$=0.20 nanoseconds (ns);
$t_{WCDataSkew}$=0.20 ns;
$t_{WCJit}$=0.50 ns; and
$t_{WCClkSkew}$=0.20 ns.

Based on the foregoing inputs, the best-case time delay that is chosen is greater than 1.10 ns. Assuming a best-case and worst-case differential factor of three, a time delay ranging from about 1.10 ns to about 3.30 ns can be realized.

While duty cycle of a LC may affect certain features of the circuit 18, duty cycle may not affect the circuit 18 from detecting LC edges. For instance, duty cycle generally does not contribute to sampling errors between consecutive data samplings. Nonetheless, duty cycle may affect $DLY_{UpperBound}$. Therefore, simulations may be conducted to ensure that a given time delay does not exceed a certain threshold or limit. In one aspect, a delay threshold ($DLY_{UpperBound}$) may be calculated using the following equation:

$$DLY_{UpperBound} = (LC_{period} \times DutyCycle) - t_{WCHLD} - t_{WCDataSkew} - t_{WCJit} - t_{WCClkSkew},$$

where:

$LC_{period}$ represents the time period of a LC cycle;

DutyCycle represents a duty cycle corresponding to the LC;

$t_{WCHLD}$ represents a worst-case flip-flop hold time of the first entries of the two data capture SRs (e.g., $SR_{NEG}$ and $SR_{POS}$);

$t_{WCDataSkew}$ represents a worst-case LC skew time between SD_IN fan-outs;

$t_{WCJit}$ represents a worst-case time regarding clock jitter of LC; and $t_{WCClkSkew}$ represents a worst-case LC skew between edge detection and data capture SRs.

Using the delay threshold ($DLY_{UpperBound}$) equation, it can be seen that the range of time delays (1.10 ns to 3.30 ns) calculated above fall within a threshold of 18.10 ns. This calculation is shown as follows:

$$DLY_{WC} = 3.30 \text{ ns} < \frac{1}{2}(38.46) - 0.20 - 0.20 - 0.50 - 0.20 = 18.10 \text{ ns} = DLY_{UpperBound},$$

where:

$LC_{period}$=38.46 ns for LC=26 MHz (assuming a 50% duty cycle); and $t_{WCHLD}$=0.20 ns.

The shortest half cycle dictated by a duty cycle may affect the extent to which a worst-case delay ($DLY_{WC}$) may be pushed into a preceding LC edge. Simulations may be conducted to determine whether a selected time delay (e.g., time delay element 21) falls between a best-case time delay and a worst-case time delay. To illustrate, a delay cell selected from a Taiwan Semiconductor Manufacturing Company® (TSMC) library may be employed. Using the DEL4 cell (found in the TSMC 901php library) as an example of a delay element 21 disclosed herein, simulations may be used to determine the following time delays:

$DEL4_{BC}$=1.34 ns (best-case or minimum delay time); and
$DEL4_{WC}$=4.02 ns (worst case or maximum delay time).

Since $DEL4_{BC}$=1.34 ns>1.10 ns, and $DEL4_{WC}$=4.02 ns<18.10 ns, conditions for using the DEL4 cell to realize a delay element 21 are satisfied.

Figure 13:
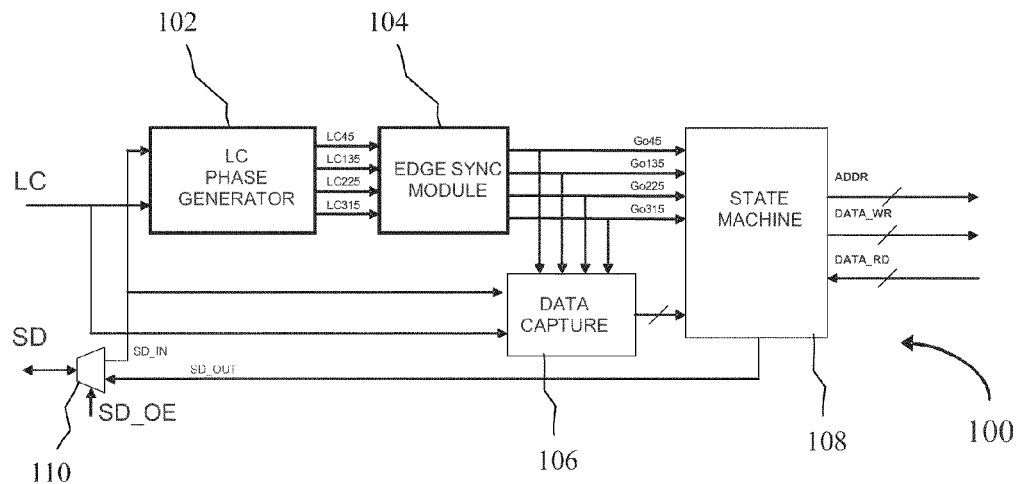
FIG. 13 is a schematic diagram of a slave interface circuit according to an embodiment of the present disclosure.

Referring now to FIG. 13, a schematic diagram depicts an embodiment of a slave interface 100 associated with a slave device 16. The slave interface 100 comprises a local clock (LC) phase generator 102, an edge synching module 104, a data capture module 106, and a state machine 108, all of which may be communicatively linked to a suitable I/O device 110. The slave interface 100 may include a protocol designed to provide a tapped delay line of 360 degrees over one frequency cycle in which the serial data (SD) line changes. While the frequency may be equal to a LC, it may be out of phase. Data may sampled at four taps, spaced about 90 degrees apart such as, but not limited to, at about 45, about 135, about 225, and about 315 degrees. The taps may be offset from zero degrees such that the rising edge of the LC may be conveniently used for clocking additional logic.

The interface protocol may employ logic and/or I/O cells selected from various cell libraries. For purposes of illustration, the interface protocol will be explained with respect to cells selected from a Taiwan Semiconductor Manufacturing Company® (TSMC) library, such as DELx cells found in the TSMC 901php library. The library parameters corresponding to a DEL4 cell are listed below in Table 2.

TABLE 2

| TSMC 901phpCell | Approx Prop Delay Time (ns) | | |
|---|---|---|---|
| | MIN | TYP | MAX |
| DEL0 | | 0.25 | |
| DEL1 | | 0.5 | |
| DEL2 | | 1.0 | |
| DEL3 | | 1.5 | |
| DEL4 | 1.2 | 2.0 | 2.8 |

Since the DELx cells are generally well balanced (e.g., $T_{PHL}$ and $t_{PLH}$ are nearly identical), the interface protocol may focus on aggregate delay times without respect to rise or fall times. As shown for cell DEL4, a data book may specify a typical (TYP) delay time from which best-case (MIN) delays and worst-case (MAX) delays may be estimated. In Table 3, an estimated MIN/MAX factor of about 2.5 may be used. Other available delay cells may also be provided in case further granularity in the design may be required. In one aspect, the interface protocol may use the following equation to estimate a number of delay cells required in a delay line chain:

26 MHz≥38.5 ns and ¼ cycle or 90 degrees≥9.6 ns.

In order to cover one cycle with delays at best-case and worst-case conditions, the following calculations may be performed for each condition, respectively:

32×DEL4s=38.4 ns (min); and

14×DEL4s=39.2 ns (max).

Based on the foregoing equation and calculations, the interface protocol may estimate that about 32 DEL4 cells are required for a complete delay line chain in the present example.

Figure 14:
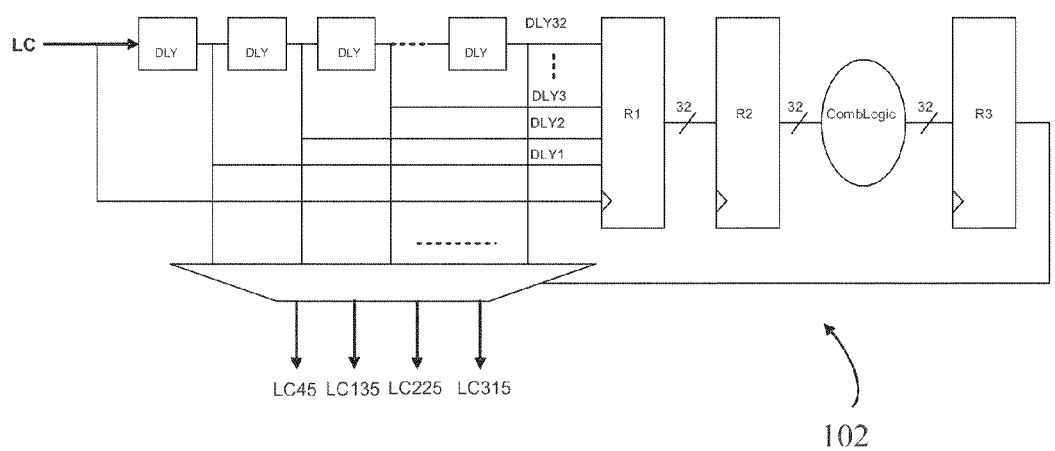
FIG. 14 is a schematic diagram of a local clock (LC) phase generator depicted in FIG. 13.

Referring now to FIG. 14, a schematic diagram of a circuit corresponding to a LC phase generator 102 is shown. FIG. 14 illustrates that the LC phase generator 102 may include circuitry for generating phase delays of about 45, about 135, about 225, and about 315 degrees. In the present example, DEL4 cells form the delay line chain. The LC phase generator 102 may include a first register R1 for clocking an image of the taps, which may subsequently be latched into a second register R2 by an inverted clock. Thus, metastability at the midpoint (falling edge of LC) and the endpoint (rising edge of LC) may be mitigated. As shown in FIG. 14, the registered tap delays may be in reverse order of an incoming clock.

In one aspect, combinational logic such as a lookup table (LT) may be used to detect the falling edge of the LC based on the 0-1 pattern of tap delays. Table 3 below depicts an example of a LT. In the example, a 50% duty cycle of LC may be assumed, where otherwise, the 1-0 pattern may be detected for the full length of a clock cycle. The outputs of the LT may be registered in a third register R3, where the outputs may be held if a corresponding calculator is disabled by signal Enable2. The outputs of the third register R3, which are the outputs of the LT, may be the selectors for multiplexers M1-M4, which are operable to provide the desired phase delays.

TABLE 3

| | DELAY = 10 BITS | | | |
|---|---|---|---|---|
| | DLY7 | | | DLY16 |
| 10 LINES | 0 | 1 | X | X | ... |
| | 0 | 0 | 1 | X | ... |
| | ⋮ | | | ⋮ |
| | 0 | 0 | 0 | ... | 1 |

As those familiar in the art will understand, the design of the LC phase generator 102 may compensate for PVT. In FIG. 14, power may be preserved by disabling the interface via Enable1. The LC phase generator 102 may only require periodic updates, yet not during a transfer (hence, Enable2 may be used). Generally, clock jitter may not be an issue since the clock frequency may be sufficiently slow, and also because there may be a sufficient delay between the 90 degree phases. In order to determine how tolerant the design is, an error term may be employed for accumulating various uncertainties in the overall design of the LC phase generator 102. If necessary, current delay taps may always be shifted. Similarly, additional taps may be employed to provide additional resolution. Of course, a phase-locked loop (PLL) may also be used to generate 4× or 8× LC sample points. However, techniques for designs without a PLL may be desirable in certain instances.

Figure 15:
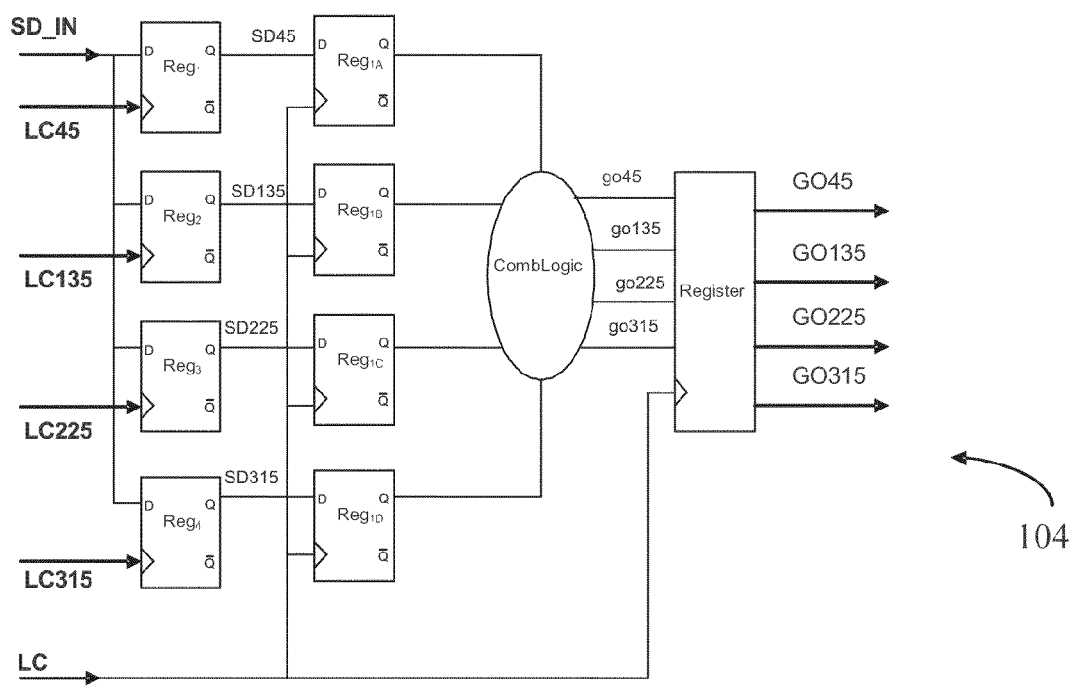
FIG. 15 is a schematic diagram of an edge synching module depicted in FIG. 13.

Referring now to FIG. 15, a schematic diagram of a circuit corresponding to an edge synching module 104 is shown. As shown in FIG. 15, the edge synching module 104 includes circuitry for synchronizing data. As previously discussed, a data frame may contain various types of bits, including a SYNC bit. In an embodiment, the edge synching module 104 is operable to use the SYNC bit to calibrate or synchronize the LC to an incoming serial data (SD) signal (SD_IN). To accomplish this, the edge synching module 104 may determine which delay tap to use (e.g., 45, 135, 225, or 315 degrees). FIG. 15 illustrates that SD may be clocked into four registers $Reg_1$-$Reg_4$, each clocked by a different tap delay. If desired, one or more of the outputs may be subsequently re-registered by LC (e.g., in $Reg_{1A}$-$Reg_{1D}$), in order to mitigate metastability.

Furthermore, the edge synching module 104 may utilize a sequence of zeroes and ones to determine which tap delay clock to use. In one aspect, noise on the SD line may be filtered by detecting two ones, which may prevent a false start. For example, a single one may occur in the go45 instance. By using a negative edge, the LC-clocked image for the 45 and 135 degree SD inputs may provide extra information to a LT for resolving this issue. An example of a LT is shown below in Table 4. In another aspect, instead of detecting multiple ones, a digital pulse-gobbling filter may be added on the SD line, which may filter noise and possibly alleviate other issues.

TABLE 4

| | SD SIGNAL | | | | |
|---|---|---|---|---|---|
| | SD45 | SD135 | SD225 | SD315 | OUTPUT |
| INPUT | 0 | 0 | 0 | 1 | GO45 |
| | 0 | 0 | 1 | 1 | GO135 |
| | 0 | 1 | 1 | 1 | GO225 |
| | 1 | 1 | 1 | 1 | GO315 |

Figure 16:
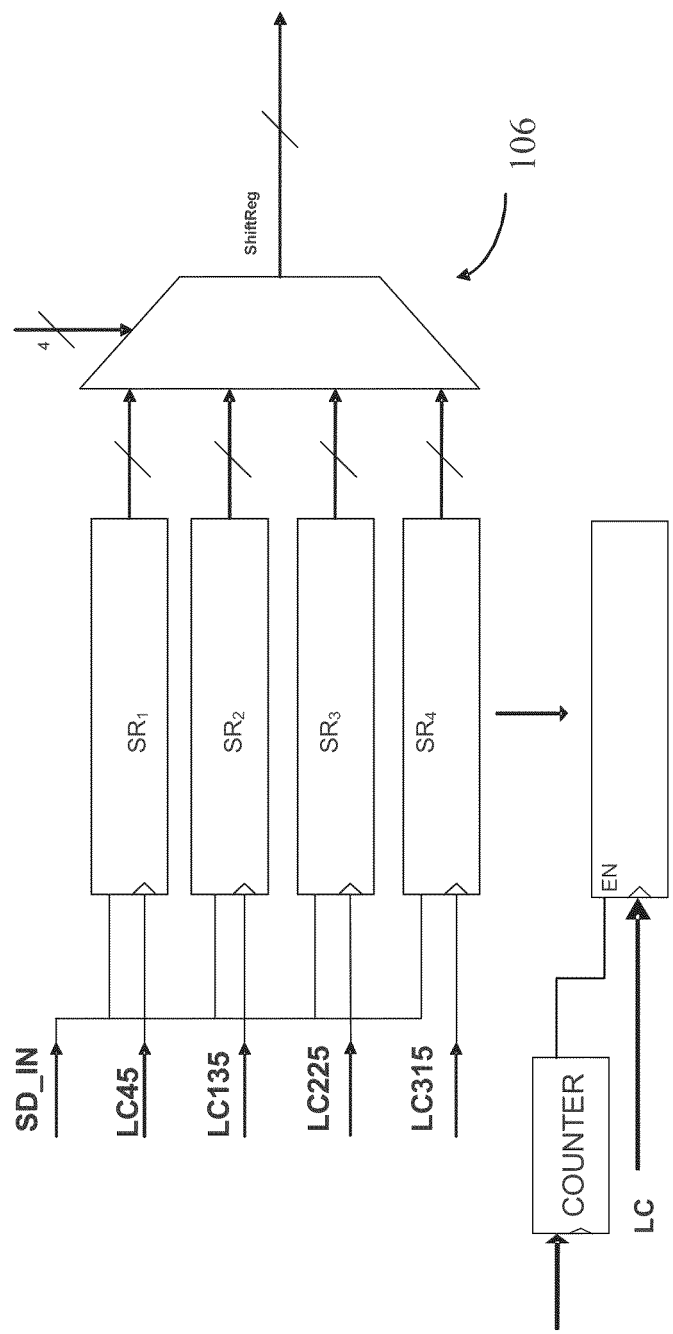
FIG. 16 is a schematic diagram of a data capture module depicted in FIG. 13.

Referring now to FIG. 16, a schematic diagram of a circuit corresponding to a data capture module 106 is shown. The data capture module 106 may be configured to reconstruct data according to various techniques based on the determination of the manner in which SD is sampled. In FIG. 16, for example, shift registers $SR_1$-$SR_4$ are operable to capture SD, and then a final transfer to the local clock (LC) domain with the data may occur. If the transfer is a write operation, then the resulting data may include an address (e.g., address bits in an address field) and data (e.g., data bits in a data field). If the transfer is a read operation, the resulting data may simply include an address.

In an embodiment, an interface for a master device 14 may also be provided. Unlike a slave device 16, however, a master device 14 may not require a LC phase generator. That is, a slave device 16 may be aware of the $LC_{slave}$-$LC_{master}$ relationship, and therefore, the slave device 16 may clock out data on the SD line at appropriate times. For instance, a slave device 16 may clock out data one 90 degree phase prior to its sampling phase, or possibly on the same sampling phase. The earlier sampling phase provides the master device 14 with additional setup time, and it may mitigate additional delays back to the master device 14 relative to its LC.

Figure 17:
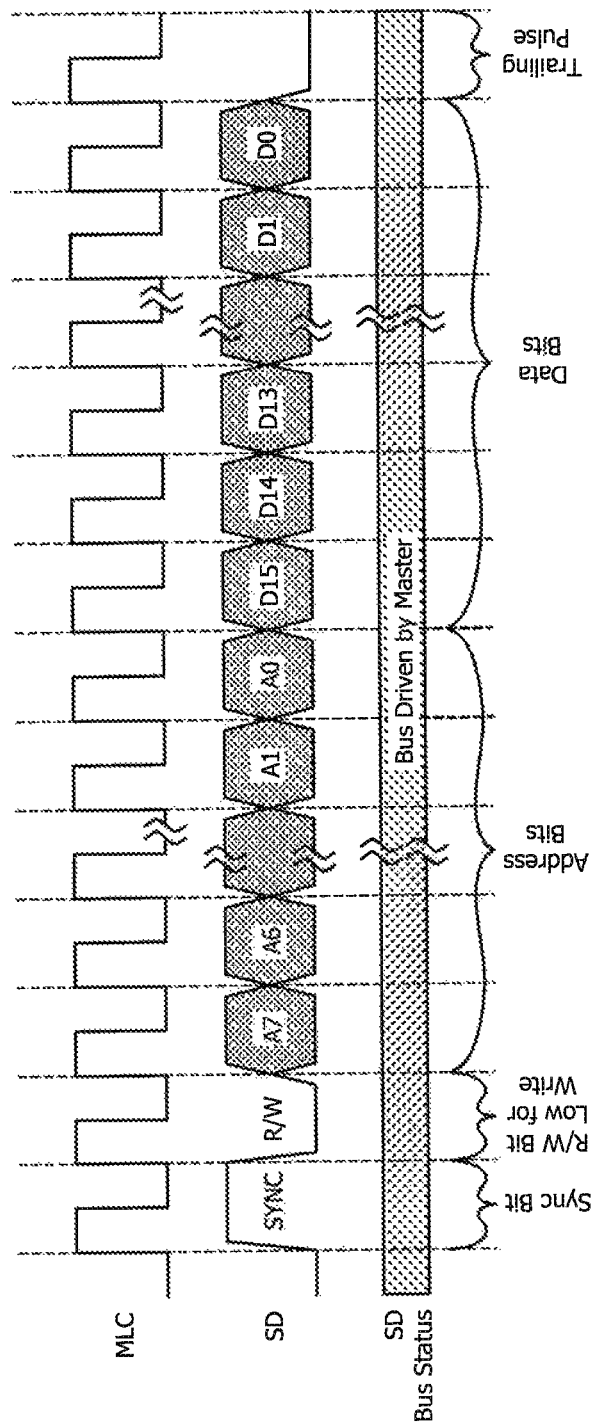
FIG. 17 is a timing diagram corresponding to a write operation based on the slave interface circuit depicted in FIG. 13.
Figure 18:
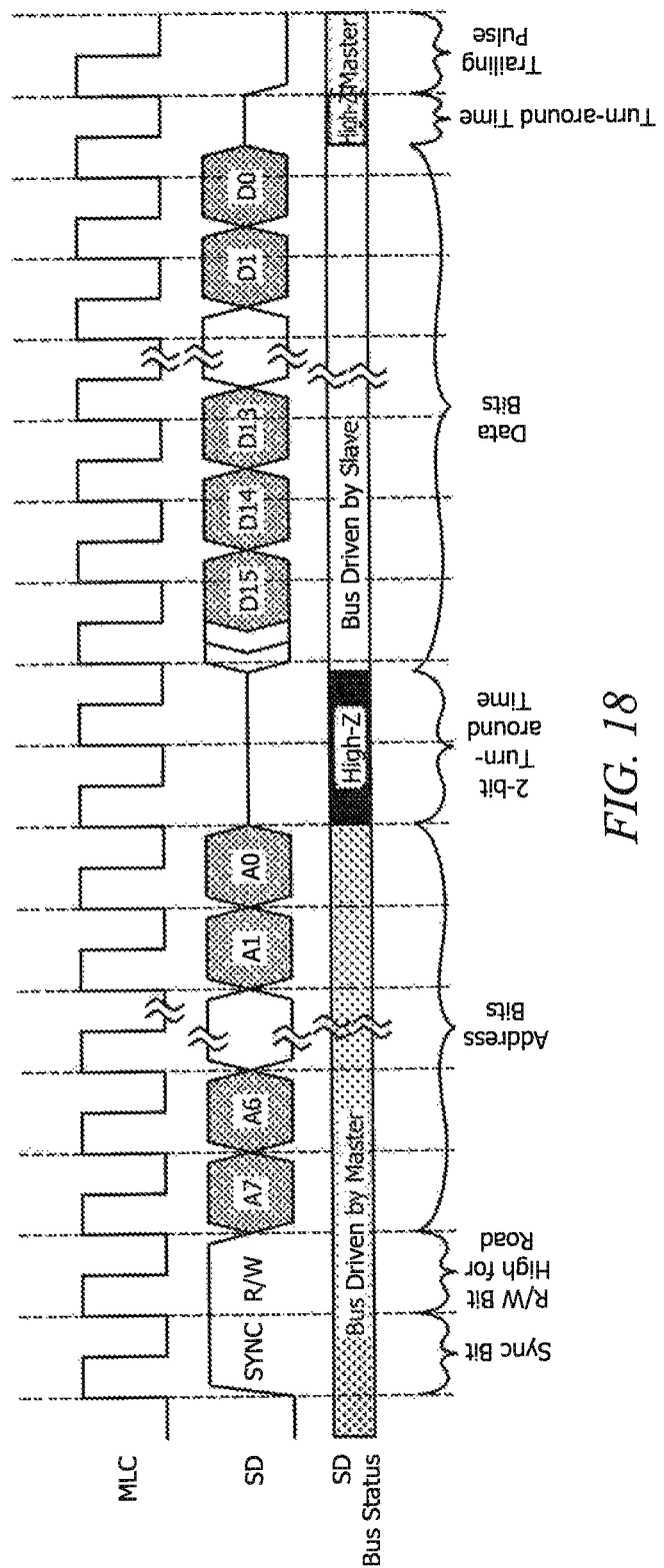
FIG. 18 is a timing diagram corresponding to a read operation based on the slave interface circuit in FIG. 13.

FIGS. 17 and 18 depict timing diagrams for write and read operations, respectively. The timing diagrams illustrate an example of a slave device 16 using the slave 100 interface described above in order to communicate with a master device 14. While the slave device 16 is operable to synchronize to serial data (SD) sent by a master device 14, the master device 14 does not need to employ the same algorithm or circuit to recover data during a read operation. The slave device 16 may be operable to send data back to the master device 14 based on a same synching manner in which the slave device 16 previously determined to synchronize SD. As shown in FIG. 18, a master device 14 may read data on a rising edge of its LC three clocks after address bit A0 is transmitted. Although the 2-bit turnaround time in the timing diagrams may be reduced to one clock, the added delay may provide relief for the slave device 16 to decode and respond to the read with data. In any case, the timing diagrams illustrate that the master device 14 and the slave device 16 are operable to transmit and recover data at a clock rate corresponding to one bit per clock cycle.

In an embodiment, a master device 14 and/or a slave device 16 may comprise a RF circuit such as a type of transceiver including registers that are non-static when read and/or not in the LC time domain. For example, certain PLL registers may be readable, yet may also be constantly changing in a non-LC domain. In addition, there may be certain circuits running such as calibration (CAL) circuits that cause periodic or continuous updating of readable registers. One manner of overcoming such issues may be to perform multiple reads (e.g., a first read may initiate a sample and a second read may grab it). Another approach may include constantly running sampling circuits with a single read, yet such a technique may not be suitable in certain implementations due to the power demand required. In another approach, a slave device 16 may be configured to return status bits along with transmitted data.

In an embodiment, a circuit (e.g., circuit 18) associated with a master 14 device and/or a slave device 16 may employ a variable read-back delay for supporting non-static registers from different time domains. A master device 14, for example, may simply wait for a SYNC bit to assert. According to one aspect, a variable read-back delay may be made available to one or more slave devices 16 that require a relatively long time to transmit data in response to a corresponding request from the master device 14.

In an embodiment, a timeout protocol may be implemented to ensure that a master device 14 does not remain in a listening mode for an indefinite duration while waiting to receive a SYNC pulse from a slave device. For instance, the SWSI bus 12 may be configured to operate at a timeout corresponding to a predetermined minimum delay, such that if the master device 16 does not detect a SYNC pulse within a predetermined time (i.e., the timeout), the master device 16 performs some type of error recovery. In another aspect, a timeout protocol may be implemented for the slave device 16. For instance, the slave device 16 may be configured to respond during a timeout to complete a handshake (i.e., rather than not responding at all). If a problem occurs during a timeout handshake, the master device 14 may be configured to detect and/or resolve the problem. Furthermore, the slave device 16 may be configured to set a bit in a control or interface register, such as a bit that can then be read by the master device 16 during error recovery.

In an embodiment, a mechanism for controlling power and/or disabling the SWSI 12 may be provided. For instance, a slave interface register may be implemented such that the register may be reserved (e.g., at address "0xff" or "0xF") for certain controls and functions. Moreover, certain bits may be auto-cleared by a slave device 16 at predetermined times. Tables 5 and 6 illustrate protocols for a slave interface register that may be implemented with one or more embodiments described herein. In both protocols, the reserved address may be 0xff, and the reset value may be 0x0000.

TABLE 5

| Bits | Name | Description |
| --- | --- | --- |
| 15 | Error | Slave reports an error (or parity error) 0: No error (reset) 1: Error |
| 14-4 | N/A | Writes ignored, reads as 0 |

TABLE 5-continued

| Bits | Name | Description |
| --- | --- | --- |
| 3-2 | TurnBitZero | Adder to number of bit times that the slave outputs a 0 bit before sending the 1$^{st}$ SYNC bit for a read. 0x0: add 0 bit (reset) 0x1: add ½ bit 0x2: add 1 bit 0x3: add 1½ bit |
| 1 | N/A | Writes ignored, reads as 0 |
| 0 | DisableInterface | Disables the interface 0: Interface enabled (reset) 1: Interface disabled |

TABLE 6

| Bits | Name | Description |
| --- | --- | --- |
| 15 | Error | Slave reports an error (or parity error). 0: No error (reset) 1: Error |
| 14-2 | N/A | Writes ignored, reads as 0 |
| 1 | ReCalPhaseGen | Override auto update of the phase generator and do a cal now 0: Do nothing (reset) 1: Update phase generator |
| 0 | DisableInterface | Disables the interface 0: Interface enabled (reset) 1: Interface disabled |

In an embodiment, a master device 14 may write data into an interface register in order to disable the SWSI 12. Moreover, the transmission of a subsequent high pulse of sufficient duration through the SWSI 12 may be used to wake a slave up. For instance, a counter associated with a slave device 16 may be operable to wake up the slave device 16 upon detecting this high pulse. Additionally or alternatively, a rising edge of a pulse transmitted via the SWSI 12 may be used to wake up a slave device 16. Furthermore, a multi-clock filter or a digital pulse-gobbling filter may be implemented for filtering noise.

In an embodiment, a slave recovery mechanism may be implemented. For instance, when a state machine (e.g., state machine 26) associated with a slave device 16 enters a non-idle state, (e.g., it may presume that a read or write transfer is being processed), the state machine may enable a simple and relatively small "watchdog" counter. The watchdog counter may either reset at upon concluding that a certain transfer or transaction has been successfully performed. Additionally or alternatively, after counting a predetermined number of low pulses on the SWSI 12, the watchdog counter may reset the state machine. The watchdog counter may be relatively small, and it may be only be active during a certain data transfer in order to minimize power usage. In a master-slave implementation based on a half-duplex system, for example, such an error recovery mechanism may prevent a slave device 16 from locking up. Further, in an embodiment where a slave interface register is implemented, errors may be reported in a bit in the slave interface register.

In an embodiment, a parity bit may be implemented on a chip for a master device 14 and/or a slave device 16, wherein the parity bit may be enabled on chip-by-chip basis. For instance, a parity bit may be associated with a transfer of data, where the parity bit may be attached at the end of the corresponding data frame or packet. In one aspect, a parity bit may be implemented on read transfers, in which case a master device 14 may be configured to receive immediate feedback. For write transfers, a slave device 16 may be configured to abort an operation, where the only feedback to the master device 14 may be reading an error bit (e.g., in an interface or control register).

Figure 19:
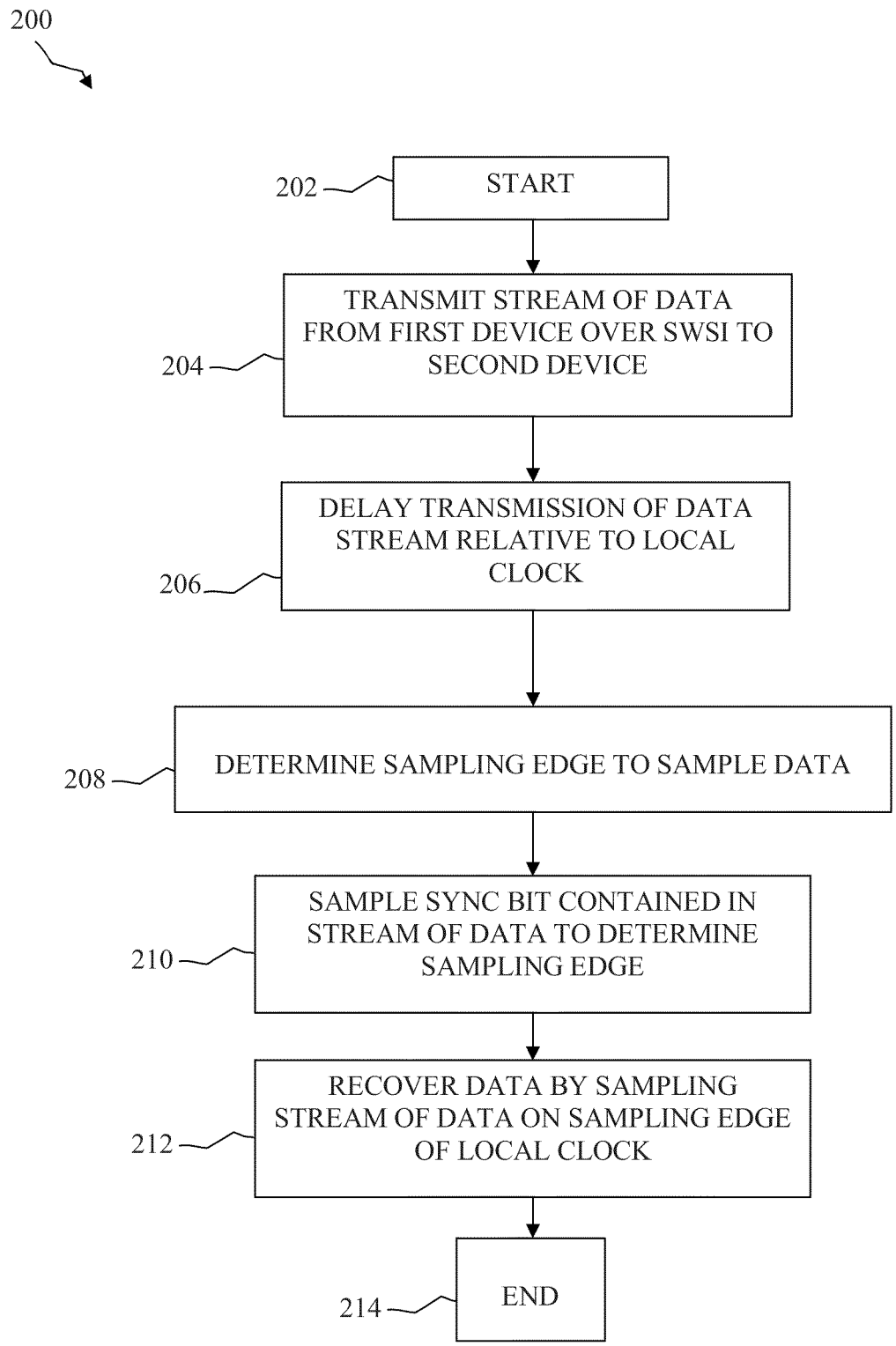
FIG. 19 is a flowchart illustrating a method for communicating data between devices interfaced to a SWSI.

Referring now to FIG. 19, a method 200 for communicating data between devices interfaced to a SWSI 12 will now be described. As those familiar in the art will appreciate, the method 200 may employ any of the features previously described herein. Additionally, the method 200 may apply to the master and slave devices 14 and 16 disclosed herein, as well as with any suitable types of communication devices. The method 200 begins in block 202. In block 204, the method 200 communicates data (e.g., a stream of bits) by a first device over the SWSI. In block 206, the transmission of data is delayed relative to a local clock (LC) of a second device, where the second device may be a device selected by the first device to receive the data. The delay operates to back up the transmitted data, and therefore, enables the second device to determine a sampling edge based on a single edge (e.g., rising or falling) of its LC, as shown in block 208. In block 210, the second device samples a SYNC bit contained in the transmitted data in order to determine the sampling edge. Consequently, the second device is operable to recover data by sampling the transmitted on the edge of the LC that the second device selects as the sampling edge, as shown in block 212. The method 200 ends in block 214. The foregoing method generally pertains to a data frame recovery process performed by either the first device or the second device (i.e., either a master or slave device 14 or 16). Therefore, if the data transmission in question pertains to a read access, the first or second device will repeat the steps in blocks 204 to 212 until each frame is recovered, As skilled artisans will readily appreciate, the various illustrative logical blocks, modules, circuits, and method described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 20:
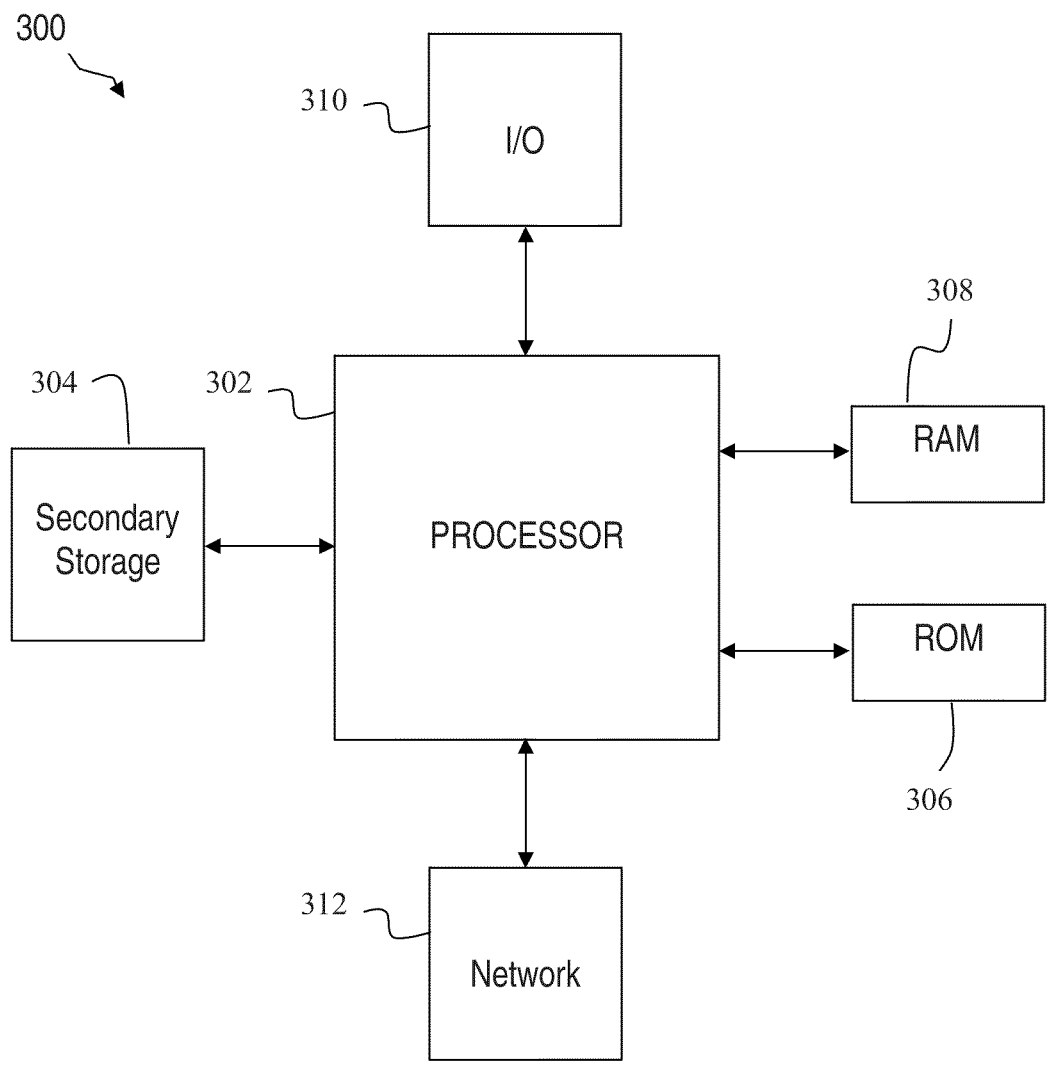
FIG. 20 is a schematic diagram of an embodiment of a general-purpose computer system.

The system components described above may be implemented on any general-purpose network component, such as a computer or network component with sufficient processing power, memory resources, and network throughput capability to handle the necessary workload placed upon it. FIG. 20 illustrates a typical, general-purpose network component 300 suitable for implementing one or more embodiments of the components disclosed herein. The network component 300 includes a processor 302 (which may be referred to as a central processor unit or CPU) that is in communication with memory devices including secondary storage 304, ROM 306, RAM 308, input/output (I/O) devices 310, and network connectivity devices 312. The processor 302 may be implemented as one or more CPU chips, or may be part of one or more ASICs and/or DSPs.

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A circuit comprising:
a single-wire serial interface (SWSI); and
a delay module coupled to the SWSI and configured to:
introduce a delay during a data transmission between the circuit and a device coupled to the SWSI, the delay being dependent on a local clock (LC) associated with the circuit, and the device including a single-sourced clock or an independently-generated clock that is in frequency with the LC; and
filter noise carried in transmitted data,
wherein the delay in the transmitted data enables the circuit to determine a sampling edge based on a single edge of the LC, and synchronize the data transmission using the sampling edge.

2. The circuit of claim 1, wherein the circuit synchronizes the data transmission by sampling on the sampling edge a synchronization (SYNC) bit contained in the transmitted data.

3. The circuit of claim 2, wherein the delay further enables the circuit to use the sampling edge to recover a stream of data bits following the SYNC bit at a full clock rate.

4. The circuit of claim 2, wherein a duration of the delay allows the circuit to determine the sampling edge based on either a positive edge or a negative edge of the LC when the device transmits data to the circuit.

5. The circuit of claim 2, wherein the circuit and the device are interfaced to the SWSI based on a point-to-point topology, wherein the point-to-point topology connects a single master to a single slave via a single wire, and wherein the circuit and the device are integrated on a same chip or a same circuit board.

6. The circuit of claim 1, wherein the single-sourced clock or the independently-generated clock is phase-independent of the LC.

7. A system comprising:
a single-wire serial interface (SWSI) for enabling data transmissions between devices;
a master device and a slave device interfaced to the SWSI, the master device including a master local clock (MLC) and the slave device including a slave local clock (SLC), wherein the master device and the slave device are each configured to employ the MLC and the SLC, respectively, for transmitting and recovering data via the SWSI; and
a delay module for introducing a delay relative to the slave device when the slave device is to recover data transmitted over the SWSI by the master device, wherein the delay module is configured to:
generate the delay based on the MLC or the SLC of the master device or the slave device, respectively; and
filter noise in data transmission,
wherein the delay in the data transmission enables the slave device to determine a sampling edge based on a single edge of the SLC, and use the sampling edge to recover data via the SWSI at a full clock rate.

8. The system of claim 7, wherein the master device drives the transmission on a rising edge of the MLC, and wherein the full clock rate corresponds to a transfer rate of one bit per clock cycle.

9. The system of claim 7, further comprising an interface register for controlling the SWSI, wherein the master device is configured to write data into the interface register for at least one of disabling and enabling the SWSI, and wherein no data is transmittable between the master device and the slave device upon disabling of the SWSI.

10. The system of claim 7, wherein the MLC is an independently-generated clock on a master chip or a common clock, and wherein the SLC is another independently-generated clock on a slave chip or the common clock, the common clock being redistributable through the system.

11. The system of claim 7, wherein the MLC is in frequency with the SLC, wherein the SLC is phase-independent of the MLC, and wherein the MLC is phase-independent of the SLC.

12. The system of claim 7, wherein the master device and the slave device are each configured to determine whether to sample the transmitted data on a rising edge or a falling edge of the MLC and SLC, respectively, the determination being based on sampling a synchronization (SYNC) bit contained in the transmitted data, and wherein the slave device includes circuitry for generating a variable read-back delay by delaying transmission of the SYNC bit and subsequent data bits, the variable read-back delay providing additional time for the slave device to acquire data requested by the master device.

13. The system of claim 7, wherein the slave device includes multiple modules integrated with the slave device on the slave chip, and wherein the master device is configured to communicate with at least one module via the SWSI, the at least one module being selected from the multiple modules.

14. The system of claim 7, further comprising multiple slave chips each being communicatively linked to the SWSI via a single wire, respectively, wherein the maser device is configured to communicate with the multiple slave chips via the SWSI.

15. A circuit associated with a device interfaced to a single-wire serial interface (SWSI), the circuit comprising:
a delay module coupled to the SWSI and configured to:
introduce a delay when the circuit is to recover data transmitted to the device through the SWSI, the delay being relative to a local clock (LC) associated with the circuit, and the device including a single-sourced clock or an independently-generated clock that is in frequency with the LC; and
filter noise carried in transmitted data,
a data analysis module coupled to the delay module and configured to determine a sampling edge based on an edge of the LC for sampling the transmitted data, wherein a duration of the delay in transmitted data enables the data analysis module to determine the sampling edge; and
a data capture module coupled to the data analysis module and configured to recover the transmitted data in accordance with the sampling edge determined by the data analysis module.

16. The circuit of claim 15, wherein the data analysis module includes combinational logic circuitry for determining whether the sampling edge is a positive edge or a negative edge of the LC.

17. The circuit of claim 16, wherein the data capture module comprises a plurality of shift registers including a first shift register and a second shift register for storing data recovered on the positive edge and the negative edge of the LC, respectively.

18. The circuit of claim 17, further comprising a state machine coupled to the data capture module and configured to monitor data transmissions over the SWSI, the state machine including a first counter and a second counter for tracking data within the first shift register and the second shift register, respectively.

19. The circuit of claim 15, further comprising a state machine configured to control data transmissions over the SWSI, the data transmissions including communicating data stored in at least one shift register residing in the data capture module in response to a command requesting the stored data, the stored data being communicated to or from the device.

* * * * *

UNITED STATES PATENT AND TRADEMARK OFFICE
CERTIFICATE OF CORRECTION

| | | |
|---|---|---|
| PATENT NO. | : 8,719,613 B2 | Page 1 of 1 |
| APPLICATION NO. | : 13/013625 | |
| DATED | : May 6, 2014 | |
| INVENTOR(S) | : Gary Neben | |

It is certified that error appears in the above-identified patent and that said Letters Patent is hereby corrected as shown below:

In the claims:

Column 24, lines 37-41, printed claim 14 should read as:
"14. The system of claim 7, further comprising multiple slave chips each being communicatively linked to the SWSI via a single wire, respectively, wherein the master device is configured to communicate with the multiple slave chips via the SWSI."

Signed and Sealed this
Fifteenth Day of July, 2014

Michelle K. Lee
*Deputy Director of the United States Patent and Trademark Office*